US012422830B2

(12) United States Patent
Takahashi et al.

(10) Patent No.: US 12,422,830 B2
(45) Date of Patent: Sep. 23, 2025

(54) OPERATION CONTROL SYSTEM FOR MONITORING PROCESS CONTROL ANOMALIES AND APPLYING COUNTERMEASURES

(71) Applicant: HITACHI INDUSTRY & CONTROL SOLUTIONS, LTD., Hitachi (JP)

(72) Inventors: Yasuhiro Takahashi, Hitachi (JP); Tomoko Ishino, Hitachi (JP); Nobuyuki Sonoda, Hitachi (JP)

(73) Assignee: HITACHI INDUSTRY & CONTROL SOLUTIONS, LTD., Hitachi (JP)

( * ) Notice: Subject to any disclaimer, the term of this patent is extended or adjusted under 35 U.S.C. 154(b) by 539 days.

(21) Appl. No.: 17/772,173

(22) PCT Filed: Oct. 9, 2020

(86) PCT No.: PCT/JP2020/038322
§ 371 (c)(1),
(2) Date: Apr. 27, 2022

(87) PCT Pub. No.: WO2021/085087
PCT Pub. Date: May 6, 2021

(65) Prior Publication Data

US 2022/0404809 A1 Dec. 22, 2022

(30) Foreign Application Priority Data

Oct. 31, 2019 (JP) ................................ 2019-198522

(51) Int. Cl.
*G05B 19/418* (2006.01)

(52) U.S. Cl.
CPC ................. *G05B 19/41835* (2013.01); *G05B 2219/31001* (2013.01)

(58) Field of Classification Search
CPC ...... G05B 2219/31395; G05B 19/4184; G05B 2219/31001; G05B 2219/31469; G06Q 10/06393
See application file for complete search history.

(56) References Cited

U.S. PATENT DOCUMENTS 9,614,963 B2 * 4/2017 Maturana ............. G06F 9/5072
2009/0265585 A1 10/2009 Ikegami
(Continued)

FOREIGN PATENT DOCUMENTS

JP 2004-178150 A 6/2004
JP 2005-071200 A 3/2005
(Continued)

OTHER PUBLICATIONS

Extended European Search Report received in corresponding European Application No. 20883047.1 dated Oct. 18, 2023.
(Continued)

*Primary Examiner* — Darrin D Dunn
(74) *Attorney, Agent, or Firm* — MATTINGLY & MALUR, PC

(57) ABSTRACT

An operation control system includes: a storing processing part configured to store collected information on abnormality in countermeasure progress information storage parts in which information on an abnormality or countermeasure information on a countermeasure to the abnormality is stored; an equipment abnormality monitor part configured to, when a length of a time period during which the abnormality continues exceeds a prescribed time period, update a state of the abnormality; a countermeasure monitor part configured to monitor a state of the countermeasure, and, when the state of the countermeasure changes, update the state of the countermeasure; and an output processing part configured to change how to output alarm information in accordance with the length of the time period during
(Continued)

which the abnormality continues and the state of the countermeasure.

7 Claims, 28 Drawing Sheets

(56) References Cited

U.S. PATENT DOCUMENTS

| | | | | |
|---|---|---|---|---|
| 2010/0222899 | A1 | 9/2010 | Blevins et al. | |
| 2013/0063264 | A1* | 3/2013 | Oktem | G06F 16/122 706/50 |
| 2014/0032151 | A1* | 1/2014 | Araki | G05B 19/41875 702/81 |
| 2015/0281453 | A1* | 10/2015 | Maturana | G06F 9/5072 379/265.12 |
| 2015/0293503 | A1* | 10/2015 | Wall | F02C 9/00 700/28 |
| 2015/0295944 | A1* | 10/2015 | Yunoki | G06F 21/56 726/24 |
| 2016/0328954 | A1* | 11/2016 | Ramadoss | G05B 19/0428 |
| 2019/0171196 | A1* | 6/2019 | Lutz | G05B 23/0272 |
| 2020/0166921 | A1* | 5/2020 | Lavid Ben Lulu | G05B 23/0294 |

FOREIGN PATENT DOCUMENTS

| | | | |
|---|---|---|---|
| JP | 2007-536637 | A | 12/2007 |
| JP | 2009-59297 | A | 3/2009 |
| JP | 2011-139401 | A | 7/2011 |
| JP | 2019-007669 | A | 1/2019 |
| JP | 2019-079512 | A | 5/2019 |

OTHER PUBLICATIONS

International Search Report of PCT/JP2020/038322 dated Dec. 22, 2020.

* cited by examiner

FIG. 15

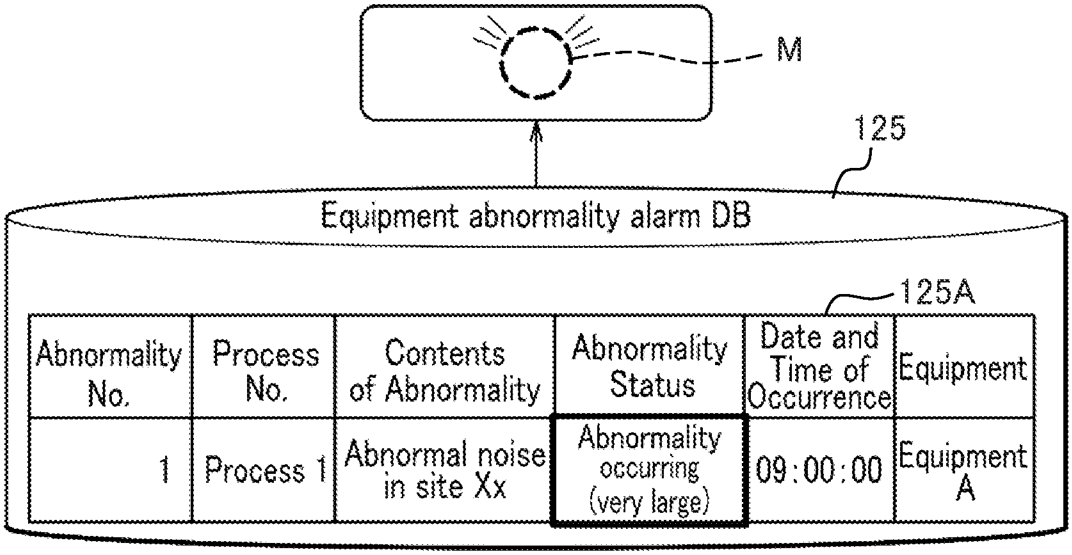

| Abnormality No. | Process No. | Contents of Abnormality | Abnormality Status | Date and Time of Occurrence | Equipment |
|---|---|---|---|---|---|
| 1 | Process 1 | Abnormal noise in site Xx | Abnormality occurring (very large) | 09:00:00 | Equipment A |

FIG. 16

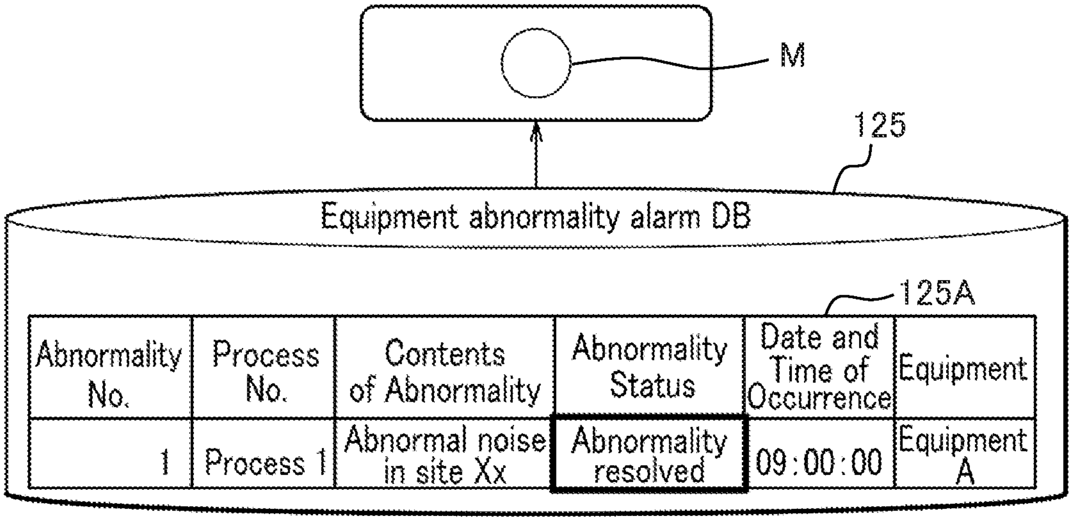

| Abnormality No. | Process No. | Contents of Abnormality | Abnormality Status | Date and Time of Occurrence | Equipment |
|---|---|---|---|---|---|
| 1 | Process 1 | Abnormal noise in site Xx | Abnormality resolved | 09:00:00 | Equipment A |

FIG. 17

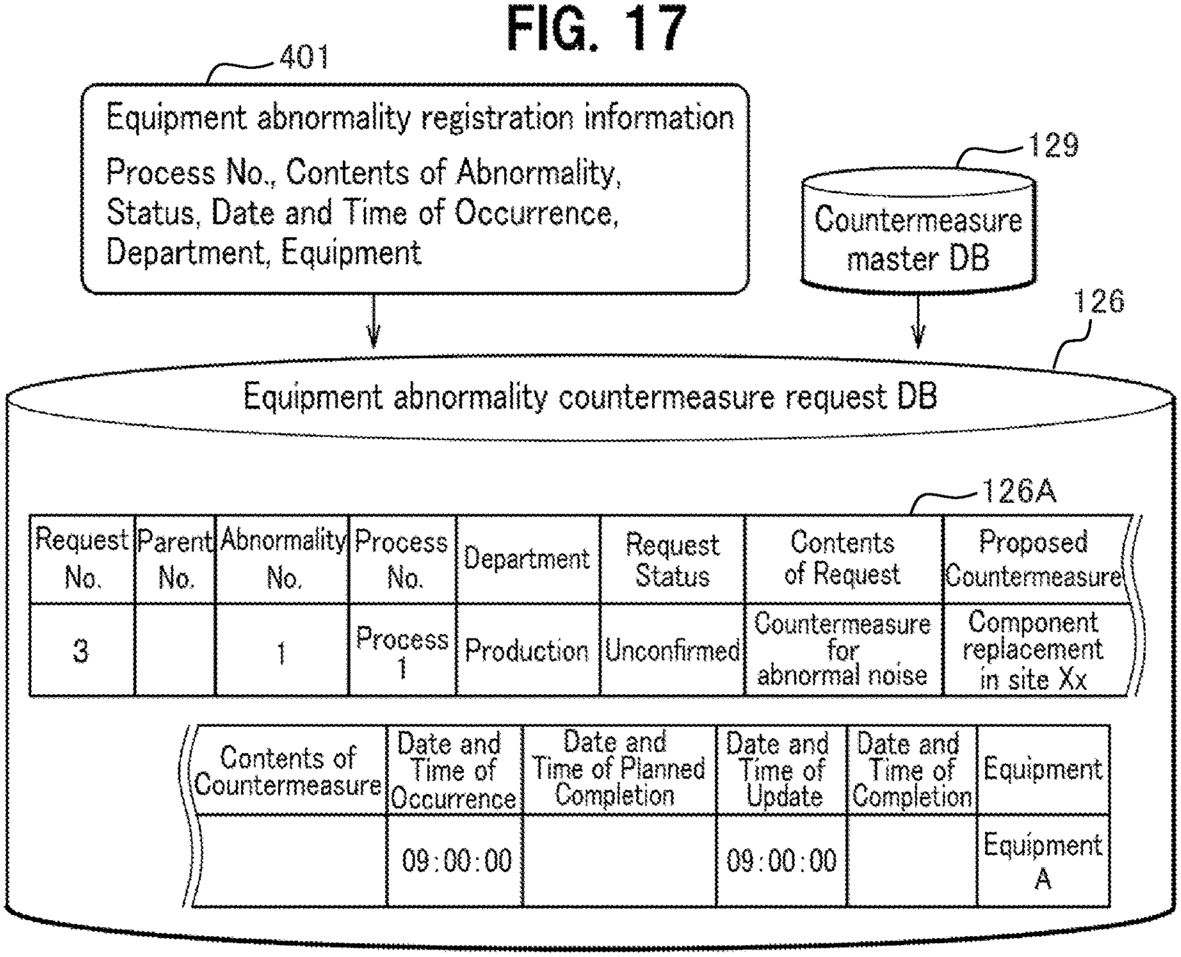

| Request No. | Parent No. | Abnormality No. | Process No. | Department | Request Status | Contents of Request | Proposed Countermeasure |
|---|---|---|---|---|---|---|---|
| 3 | | 1 | Process 1 | Production | Unconfirmed | Countermeasure for abnormal noise | Component replacement in site Xx |

| Contents of Countermeasure | Date and Time of Occurrence | Date and Time of Planned Completion | Date and Time of Update | Date and Time of Completion | Equipment |
|---|---|---|---|---|---|
| | 09:00:00 | | 09:00:00 | | Equipment A |

FIG. 18

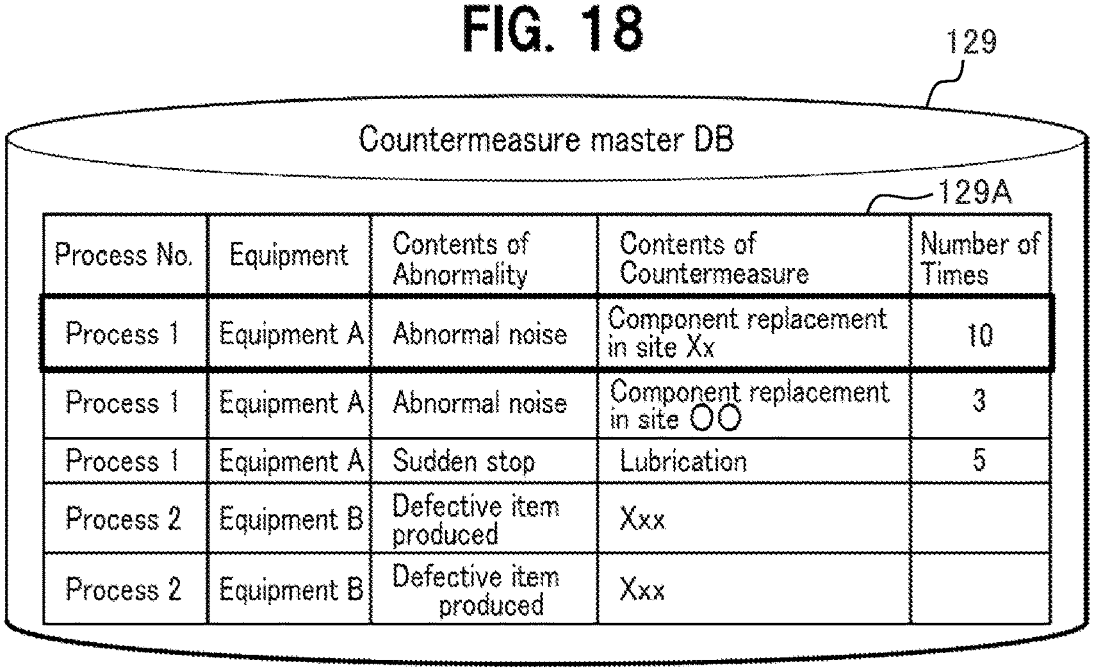

| Process No. | Equipment | Contents of Abnormality | Contents of Countermeasure | Number of Times |
|---|---|---|---|---|
| Process 1 | Equipment A | Abnormal noise | Component replacement in site Xx | 10 |
| Process 1 | Equipment A | Abnormal noise | Component replacement in site ○○ | 3 |
| Process 1 | Equipment A | Sudden stop | Lubrication | 5 |
| Process 2 | Equipment B | Defective item produced | Xxx | |
| Process 2 | Equipment B | Defective item produced | Xxx | |

FIG. 19

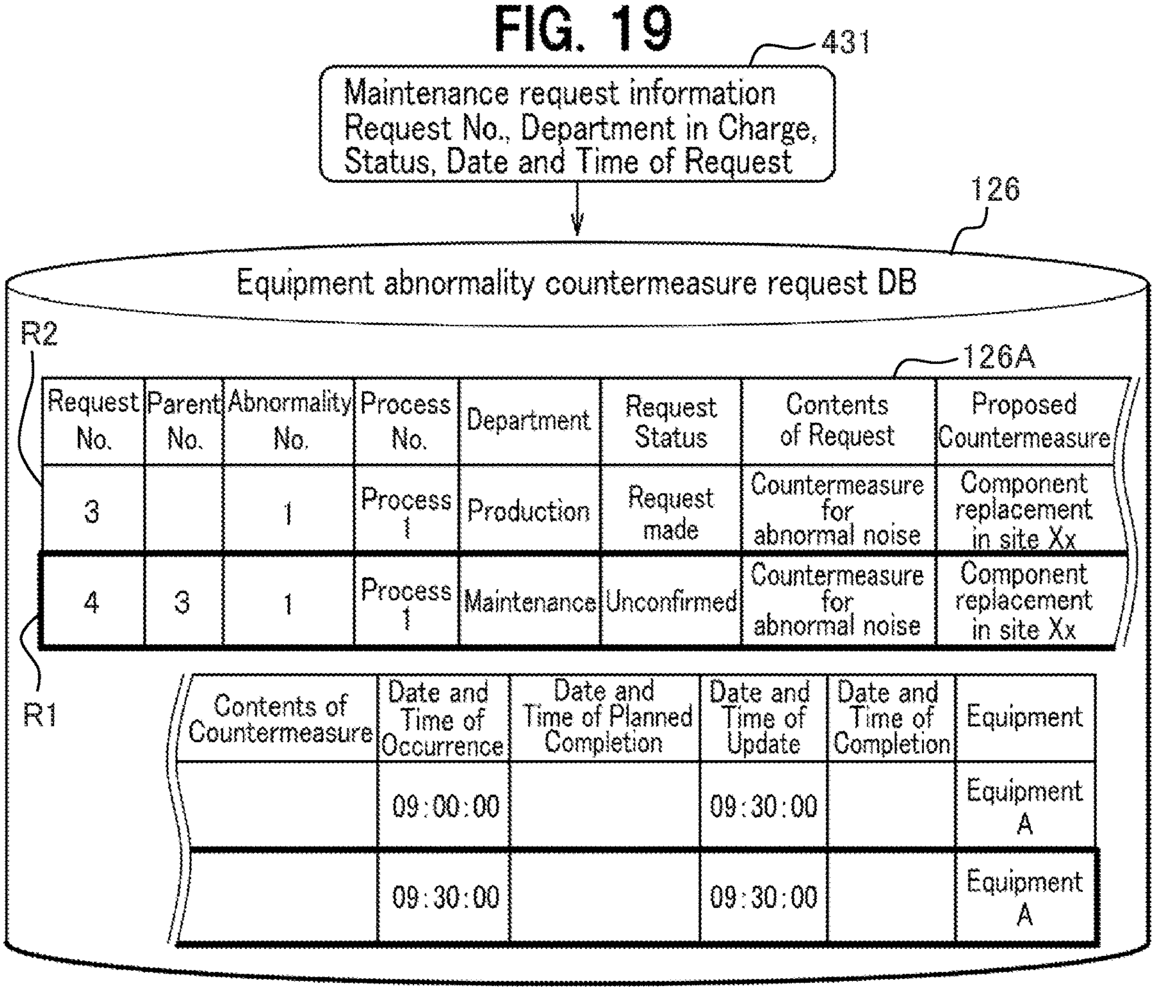

| Request No. | Parent No. | Abnormality No. | Process No. | Department | Request Status | Contents of Request | Proposed Countermeasure |
|---|---|---|---|---|---|---|---|
| 3 | | 1 | Process 1 | Production | Request made | Countermeasure for abnormal noise | Component replacement in site Xx |
| 4 | 3 | 1 | Process 1 | Maintenance | Unconfirmed | Countermeasure for abnormal noise | Component replacement in site Xx |

| Contents of Countermeasure | Date and Time of Occurrence | Date and Time of Planned Completion | Date and Time of Update | Date and Time of Completion | Equipment |
|---|---|---|---|---|---|
| | 09:00:00 | | 09:30:00 | | Equipment A |
| | 09:30:00 | | 09:30:00 | | Equipment A |

FIG. 20

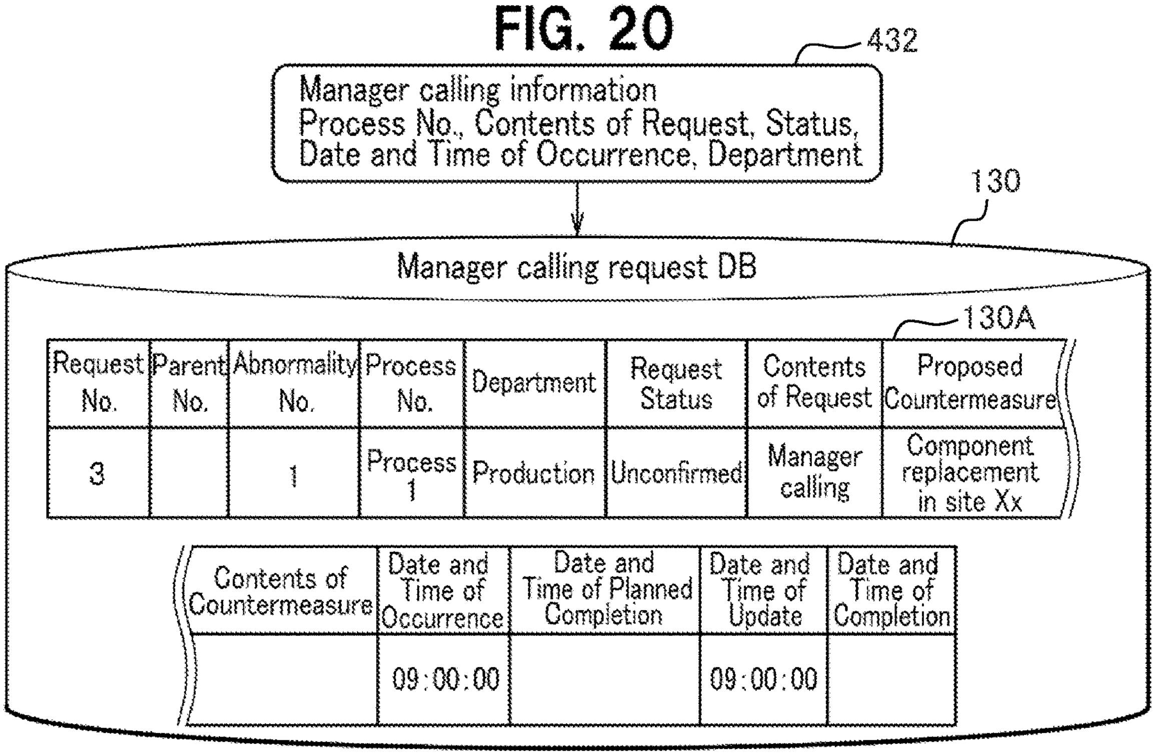

| Request No. | Parent No. | Abnormality No. | Process No. | Department | Request Status | Contents of Request | Proposed Countermeasure |
|---|---|---|---|---|---|---|---|
| 3 | | 1 | Process 1 | Production | Unconfirmed | Manager calling | Component replacement in site Xx |

| Contents of Countermeasure | Date and Time of Occurrence | Date and Time of Planned Completion | Date and Time of Update | Date and Time of Completion |
|---|---|---|---|---|
| | 09:00:00 | | 09:00:00 | |

Equipment abnormality countermeasure request DB

126A

| Request No. | Parent No. | Abnormality No. | Process No. | Department | Request Status | Contents of Request |
|---|---|---|---|---|---|---|
| 3 | | 1 | Process 1 | Production | Unconfirmed | Countermeasure for abnormal noise |

| Proposed Countermeasure | Contents of Countermeasure | Date and Time of Occurrence | Date and Time of Planned Completion | Date and Time of Update | Date and Time of Completion | Equipment |
|---|---|---|---|---|---|---|
| Component replacement in site Xx | | 09:00:00 | | 09:00:00 | | Equipment A |

Equipment abnormality countermeasure registration information
Request No., Status, Date and Time of Planned Completion, Date and Time of Update

126

Equipment abnormality countermeasure request DB

126A

| Request No. | Parent No. | Abnormality No. | Process No. | Department | Request Status | Contents of Request |
|---|---|---|---|---|---|---|
| 3 | | 1 | Process 1 | Production | Countermeasure in execution | Countermeasure for abnormal noise |

| Proposed Countermeasure | Contents of Countermeasure | Date and Time of Occurrence | Date and Time of Planned Completion | Date and Time of Update | Date and Time of Completion | Equipment |
|---|---|---|---|---|---|---|
| Component replacement in site Xx | | 09:00:00 | 09:20:00 | 09:10:00 | | Equipment A |

FIG. 24

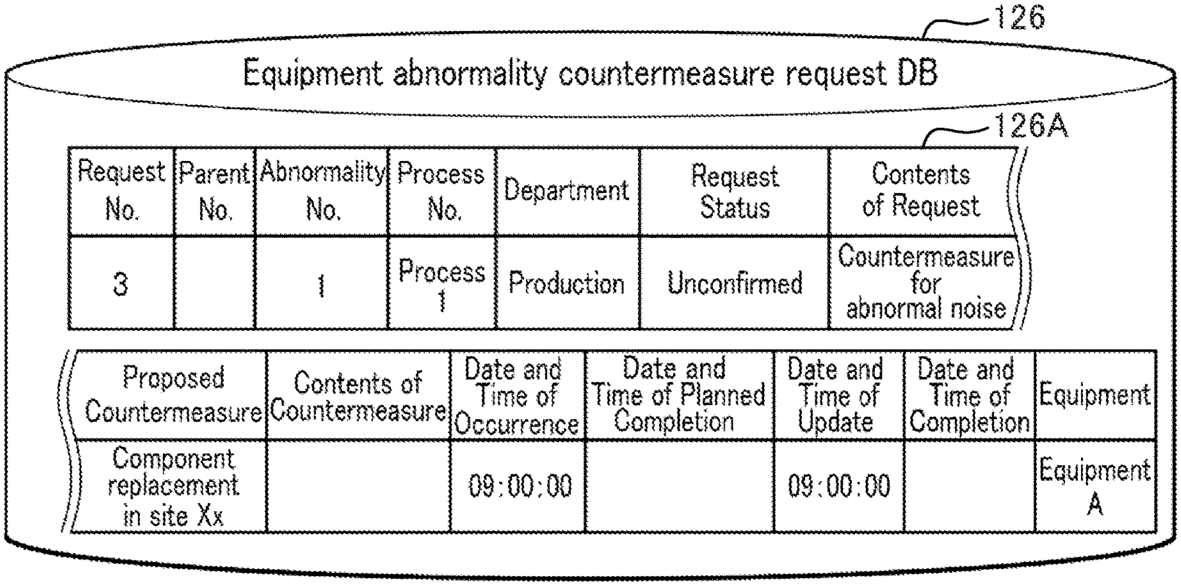

| Request No. | Parent No. | Abnormality No. | Process No. | Department | Request Status | Contents of Request |
|---|---|---|---|---|---|---|
| 3 | | 1 | Process 1 | Production | Unconfirmed | Countermeasure for abnormal noise |

| Proposed Countermeasure | Contents of Countermeasure | Date and Time of Occurrence | Date and Time of Planned Completion | Date and Time of Update | Date and Time of Completion | Equipment |
|---|---|---|---|---|---|---|
| Component replacement in site Xx | | 09:00:00 | | 09:00:00 | | Equipment A |

FIG. 25

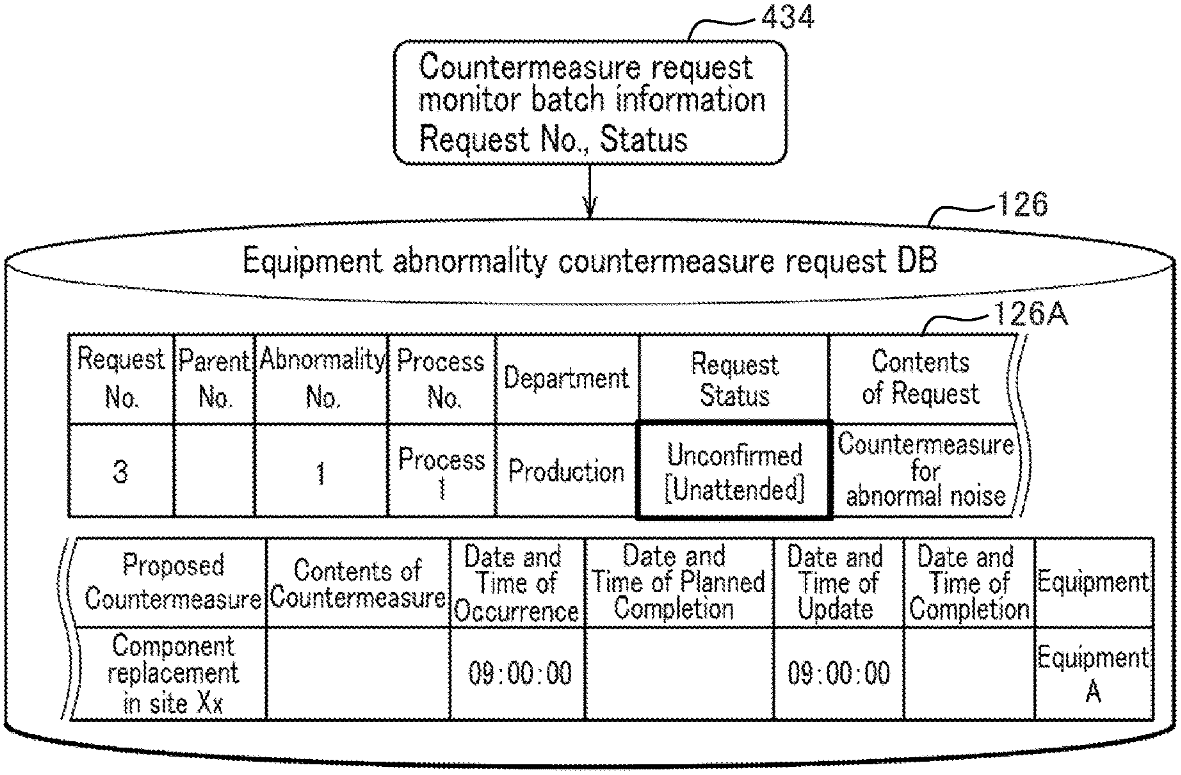

| Request No. | Parent No. | Abnormality No. | Process No. | Department | Request Status | Contents of Request |
|---|---|---|---|---|---|---|
| 3 | | 1 | Process 1 | Production | Unconfirmed [Unattended] | Countermeasure for abnormal noise |

| Proposed Countermeasure | Contents of Countermeasure | Date and Time of Occurrence | Date and Time of Planned Completion | Date and Time of Update | Date and Time of Completion | Equipment |
|---|---|---|---|---|---|---|
| Component replacement in site Xx | | 09:00:00 | | 09:00:00 | | Equipment A |

FIG. 26

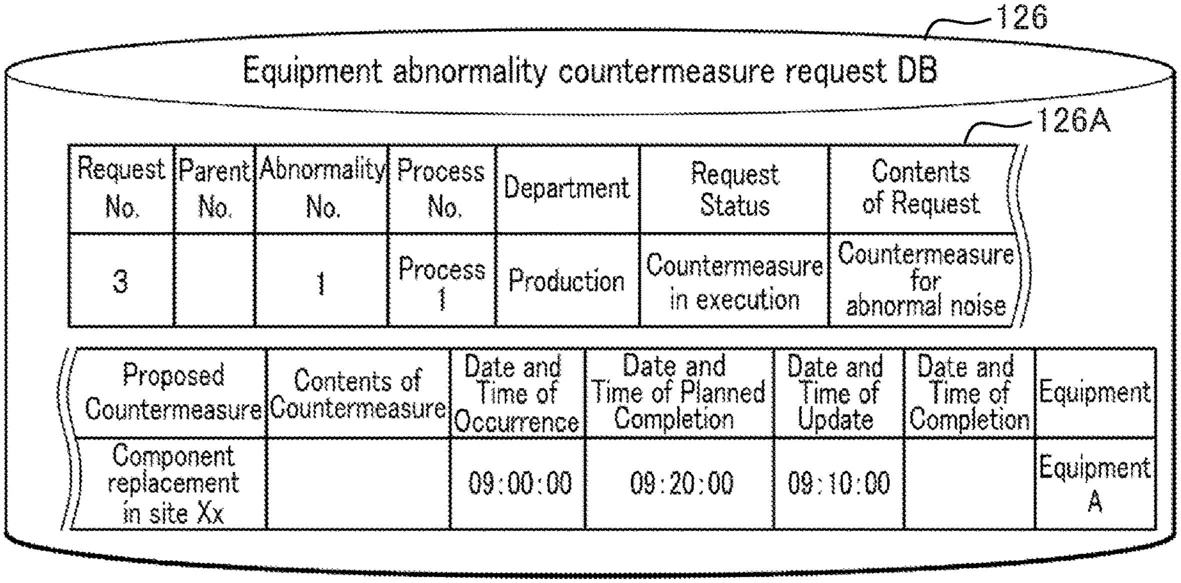

| Request No. | Parent No. | Abnormality No. | Process No. | Department | Request Status | Contents of Request |
|---|---|---|---|---|---|---|
| 3 | | 1 | Process 1 | Production | Countermeasure in execution | Countermeasure for abnormal noise |

| Proposed Countermeasure | Contents of Countermeasure | Date and Time of Occurrence | Date and Time of Planned Completion | Date and Time of Update | Date and Time of Completion | Equipment |
|---|---|---|---|---|---|---|
| Component replacement in site Xx | | 09:00:00 | 09:20:00 | 09:10:00 | | Equipment A |

FIG. 27

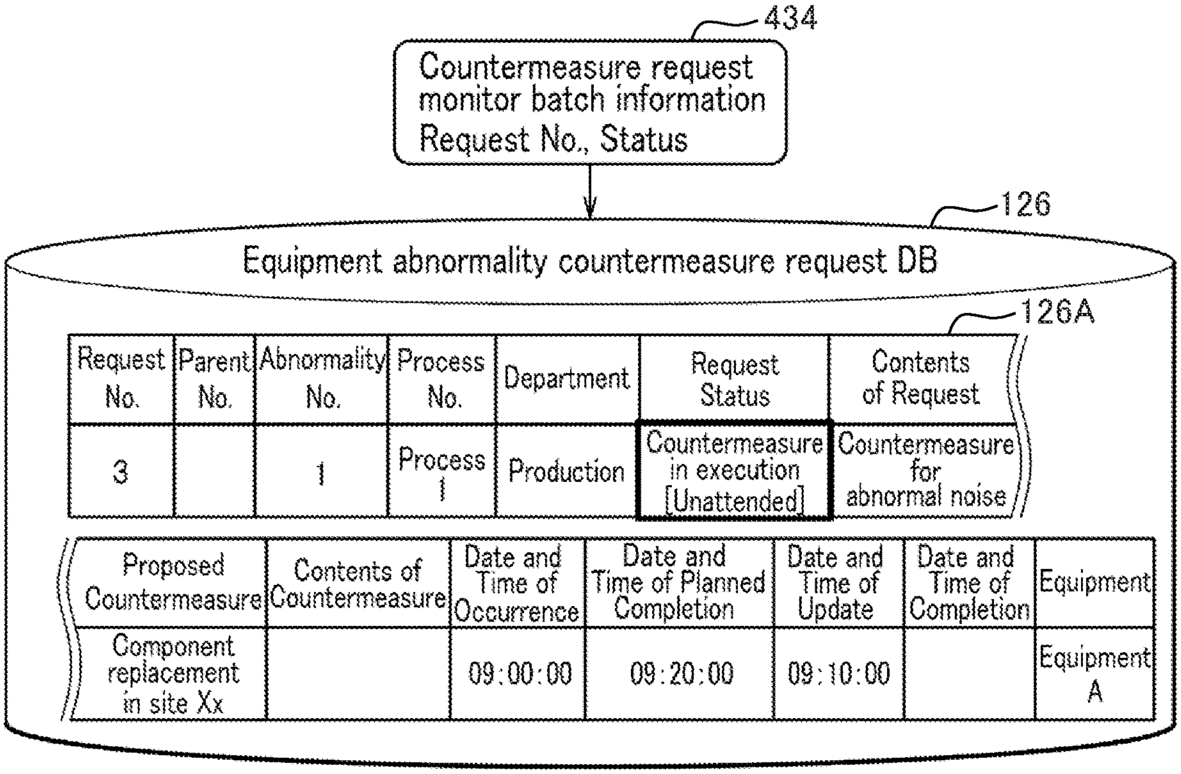

| Request No. | Parent No. | Abnormality No. | Process No. | Department | Request Status | Contents of Request |
|---|---|---|---|---|---|---|
| 3 | | 1 | Process 1 | Production | Countermeasure in execution [Unattended] | Countermeasure for abnormal noise |

| Proposed Countermeasure | Contents of Countermeasure | Date and Time of Occurrence | Date and Time of Planned Completion | Date and Time of Update | Date and Time of Completion | Equipment |
|---|---|---|---|---|---|---|
| Component replacement in site Xx | | 09:00:00 | 09:20:00 | 09:10:00 | | Equipment A |

| Request No. | Parent No. | Abnormality No. | Process No. | Department | Request Status | ... |
|---|---|---|---|---|---|---|
| | | | | | | |

| Request No. | Parent No. | Abnormality No. | Process No. | Department | Request Status | ... |
|---|---|---|---|---|---|---|
| 3 | | 1 | Process 1 | Production | Unconfirmed | |

| Request No. | Parent No. | Abnormality No. | Process No. | Department | Request Status | ... |
|---|---|---|---|---|---|---|
| 3 | | 1 | Process 1 | Production | Unconfirmed [Unattended] | |

| | Abnormality in Progress | Abnormality in Quality | Abnormality in Equipment | Abnormality in Safety |
|---|---|---|---|---|
| Manufacture A | 9 | 13 | 5 | 1 |
| Manufacture B | 10 | 14 | 6 | 2 |
| Assembly A | 11 | 15 | 7 | 3 |
| Assembly B | 12 | 16 | 8 | 4 |

FIG. 44A
126A
| Department | Request Status |
| --- | --- |
| Production | Countermeasure in progress |
FIG. 44B
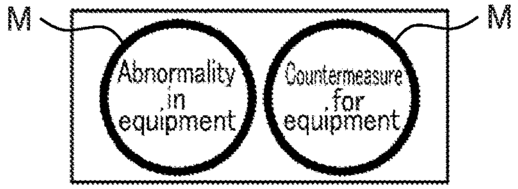
FIG. 44C
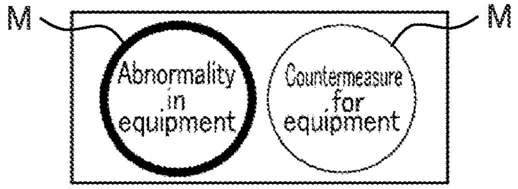
FIG. 45A
126A
| Department | Request Status |
| --- | --- |
| Production | Request made |
| Maintenance | Unconfirmed |
FIG. 45B
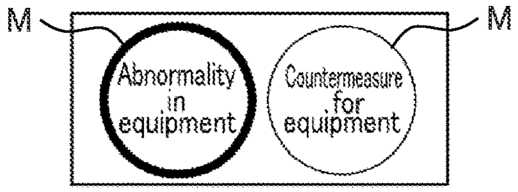
FIG. 45C
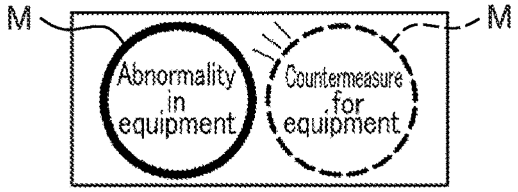

FIG. 46A
126A
| Department | Request Status |
|---|---|
| Production | Request made |
| Maintenance | Countermeasure in progress |
FIG. 46B
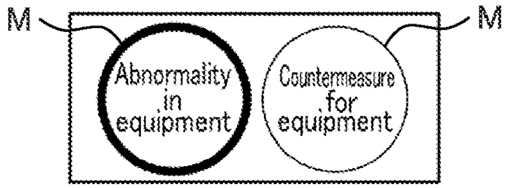
FIG. 46C
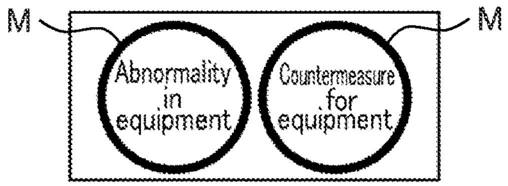
FIG. 47A
126A
| Department | Request Status |
|---|---|
| Production | Countermeasure completed |
| Maintenance | Countermeasure completed |
FIG. 47B
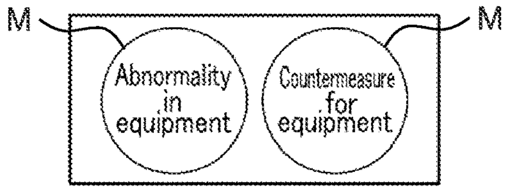
FIG. 47C
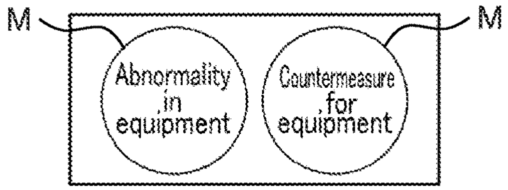

OPERATION CONTROL SYSTEM FOR MONITORING PROCESS CONTROL ANOMALIES AND APPLYING COUNTERMEASURES

TECHNICAL FIELD

The present invention relates to techniques of an operation control system and an operation control method.

BACKGROUND ART

In the assembling and manufacturing industry, manufacturing and management forms in accordance with product characteristics of various types have developed, as its market becomes mature. Business strategies and measures taken by manufactures have also become diversified and complicated. There is a rapidly growing need for the enterprises to, as a matter of business survival, improve business operations by grasping actual conditions at work sites quickly and accurately and speeding up a cycle of PDCA (Plan Do Check Action) to take appropriate measures as quickly as possible. A number of companies thus make use of IT (Information Technology) systems to collect actual achievements at work sites with respect to production or quality and to visualize actual conditions at work sites.

Patent Document 1 and Patent Document 2 disclose techniques of production process management as described above.

Patent Document 1 discloses an integrated production management method and an integrated production management system by a production process management chart, in each of which "a strategy map table 206 which is a correspondence table between KGIs and KIPs is created based on a balanced score card; and, a search refinement by some selection windows based on the strategy map table 206 can shift a screen displaying a KGI to a screen display a KPI corresponding thereto".

Patent Document 2 discloses a production line management device which includes "an external information acquisition part 211 that acquires information from an external system 50 and an expert system 60; a manager terminal receive/transmit part 213 that communicates with a manager terminal 30 and thereby receives and transmits information therebetween; a person-in-charge receive/transmit part 214 that communicates with a person-in-charge terminal 40 and thereby receives and transmits information therebetween; a calculation part 215 that performs a designated calculation using a prepared function, creates information A to F constituting a decision-making assistance screen in accordance with given definition information, and transmits the created information; and an information storage part 212 that makes a storage device 22 store external information, information from the person-in-charge terminal, a calculated result, or the like (including a case when the information is stored in an external storage device 25), and reads out necessary information".

RELATED ART DOCUMENTS

Patent Documents

[Patent Document 1] Japanese Laid-Open Patent Application, Publication No. 2004-178150

[Patent Document 2] Japanese Laid-Open Patent Application, Publication No. 2009-59297

SUMMARY OF THE INVENTION

Problems to be Solved by the Invention

The technique disclosed in Patent Document 1 still requires, however, a further improvement so as to increase efficiency of the PDCA. The technique and the like disclosed in Patent Document 2 have some problems as follows when operated.

(A1) The technique is in many cases directed to a simple visualization of actual achievement in numerical terms, which takes time to determine whether or not an abnormality has occurred.

(A2) The technique can recognize an abnormality but fails to follow up a countermeasure to the abnormality, which does not always result in a prompt response thereto.

(A3) The technique is almost focused on visualization of specific information such as a production progress display, which fails to provide an overall condition of a factory across its operations.

(A4) Different users wish to see different ranges or contents of information depending on their work categories or work positions. The technique cannot promptly provide a user with information which the user wants to view.

In light of the above-described background, the present invention has been made in an attempt to realize an efficient PDCA.

Means for Solving the Problems

An operation control system includes: a storing processing part configured to collect information on an abnormality in a plurality of departments of a factory, a plurality of the departments having a hierarchical relationship therebetween, and store the collected information on the abnormality in an abnormality information storage part in which abnormality information including information on a state of the abnormality is stored, or in a countermeasure progress information storage part in which countermeasure information including information on a state of a countermeasure for the abnormality is stored; an abnormality monitor part configured to monitor a length of a time period during which the abnormality continues, and, when the length of the time period exceeds a prescribed time period, update the state of the abnormality in the abnormality information in the abnormality information storage part; a countermeasure monitor part configured to monitor the state of the countermeasure, and, when the state of the countermeasure changes, update the state of the countermeasure of the countermeasure information in the countermeasure progress information storage part; an output processing part configured to change how to output alarm information representing the state of the abnormality and the state of the countermeasure, in accordance with the state of the abnormality in the abnormality information and the state of the countermeasure in the countermeasure information; and an output part configured to output the alarm information.

Other means for solving the problems will be described in embodiments.

Advantageous Effects of the Invention

The present invention can realize an efficient PDCA.

BRIEF DESCRIPTION OF THE DRAWINGS

FIG. 15 is a diagram (4) illustrating an example of the abnormality occurrence alarm display.

FIG. 16 is a diagram (5) illustrating an example of the abnormality occurrence alarm display.

FIG. 17 is a diagram (1) for explaining a registration of a request for a countermeasure in response to an abnormality occurred.

FIG. 18 is a diagram (2) for explaining the registration of the request for the countermeasure in response to the abnormality occurred.

FIG. 19 is a diagram (3) for explaining the registration of the request for the countermeasure in response to the abnormality occurred.

FIG. 20 is a diagram (4) for explaining the registration of the request for the countermeasure in response to the abnormality occurred.

FIG. 21 is a diagram (1) for explaining, in response to a request for a countermeasure, a registration of a state of the countermeasure.

FIG. 22 is a diagram (2) for explaining, in response to the request for the countermeasure, the registration of the state of the countermeasure.

FIG. 24 is a diagram (1) for explaining a processing performed when an abnormality in a equipment is left unattended without making a request for a countermeasure for the abnormality.

FIG. 25 is a diagram (2) for explaining the processing performed when the abnormality in the equipment is left unattended without making the request for the countermeasure for the abnormality.

FIG. 26 is a diagram (1) for explaining a processing performed when a request for a countermeasure for the abnormality has been made, and, nevertheless, an abnormality is left unattended, even after a current time is beyond a time scheduled for the countermeasure.

FIG. 27 is a diagram (2) for explaining the processing performed when the request for the countermeasure for the abnormality has been made, and, nevertheless, the abnormality is left unattended, even after the current time is beyond the time scheduled for the countermeasure.

FIG. 36 is a diagram illustrating an example of priority order definition master information in "Production process".

FIG. 44A is a diagram (1) for explaining switching of alarm information upon a request for a countermeasure to other department.

FIG. 44B is a diagram (2) for explaining switching of the alarm information upon the request for the countermeasure to other department.

FIG. 44C is a diagram (3) for explaining switching of the alarm information upon the request for the countermeasure to other department.

FIG. 45A is a diagram (4) for explaining switching of the alarm information upon the request for the countermeasure to other department.

FIG. 45B is a diagram (5) for explaining switching of the alarm information upon the request for the countermeasure to other department.

FIG. 45C is a diagram (6) for explaining switching of the alarm information upon the request for the countermeasure to other department.

FIG. 46A is a diagram (7) for explaining switching of the alarm information upon the request for the countermeasure to other department.

FIG. 46B is a diagram (8) for explaining switching of the alarm information upon the request for the countermeasure to other department.

FIG. 46C is a diagram (9) for explaining switching of the alarm information upon the request for the countermeasure to other department.

FIG. 47A is a diagram (10) for explaining switching of the alarm information upon the request for the countermeasure to other department.

FIG. 47B is a diagram (11) for explaining switching of the alarm information upon the request for the countermeasure to other department.

FIG. 47C is a diagram (12) for explaining switching of the alarm information upon the request for the countermeasure to other department.

EMBODIMENTS FOR CARRYING OUT THE INVENTION

Next is described an embodiment for carrying out the present invention (to be simply referred to as an "embodiment") in detail with reference to related drawings.

Outline

An outline of a PDCA control system 1 according to this embodiment is described.

The PDCA control system 1 according to the embodiment performs the following steps.

(B1) "Schedule information" and "achievement result information" of various operations in a factory is collected also from other system on a real-time basis (Plan Do).

After the processing of (B1) is conducted, the PDCA control system 1 according to the embodiment performs the following processings. Details of the respective processings will be described hereinafter.

(B2) Whether or not an abnormality has occurred is determined based on the collected information. When an abnormality is determined to have occurred, the result is displayed to make known on a large board. Information on the abnormality is also displayed and analyzed from various perspectives, and causes and effects of the abnormality are specified (Check).

(B3) A state of a countermeasure is displayed to attract attentions and to encourage to take a countermeasure (Action).

<System Configuration>

Figure 1:
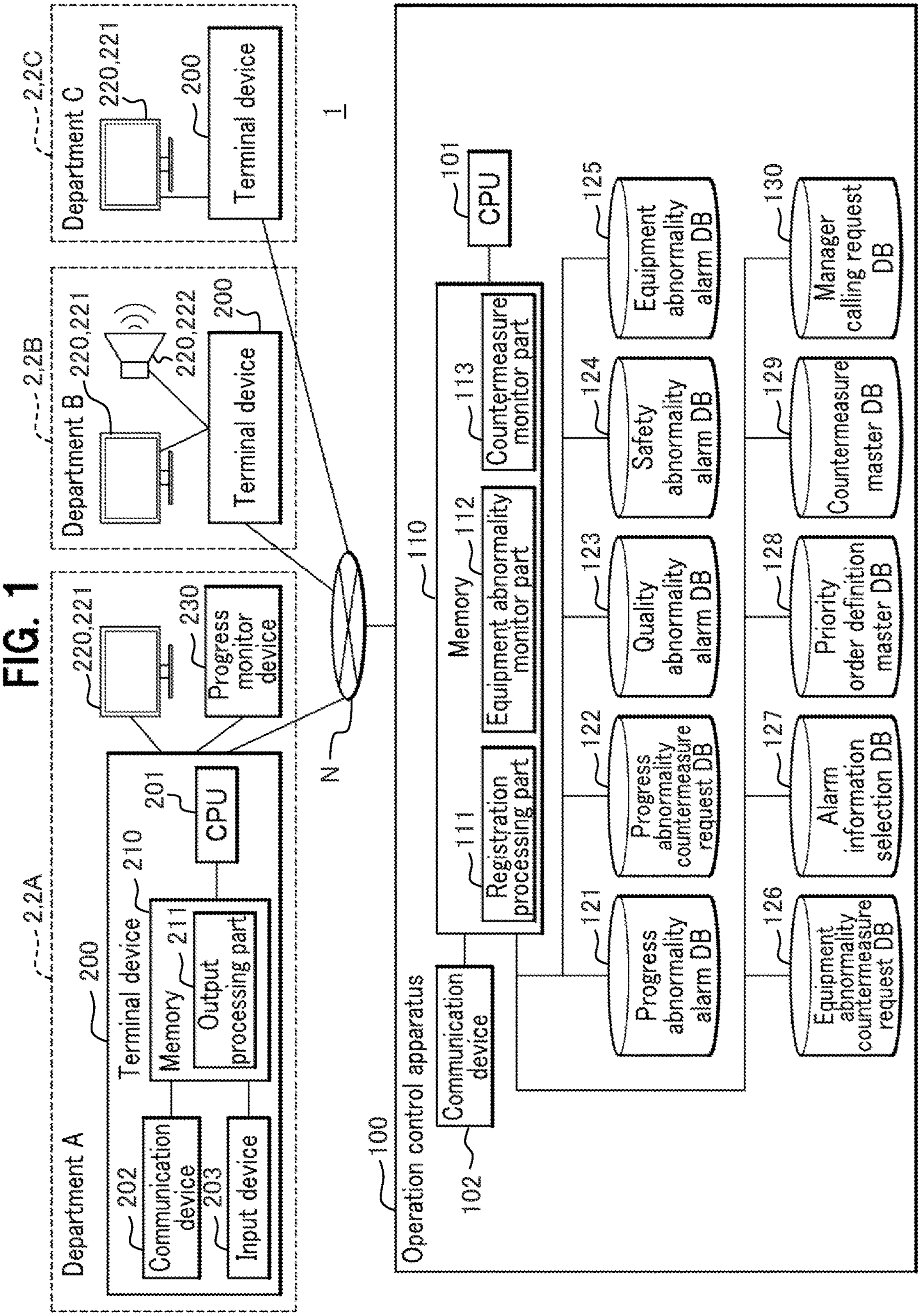
FIG. 1 is a diagram illustrating an example of a configuration of a PDCA control system according to an embodiment of the present invention.

FIG. 1 is a diagram illustrating an example of a configuration of the PDCA control system 1 according to an embodiment of the present invention.

The PDCA control system 1 includes an operation control apparatus 100 that controls a PDCA in a department 2 (The term "department 2" used herein may collectively refer to a plurality of different departments).

The operation control apparatus 100 includes a memory 110, a CPU (Central Processing Unit) 101, and a communication device 102. The memory 110 stores therein a program loaded from a storage device not illustrated. The CPU 101 executes the loaded program, which realizes respective functions of a registration processing part 111, an equipment abnormality monitor part 112, and a countermeasure monitor part 113.

The registration processing part 111 stores information transmitted from the terminal device 200 in respective DBs 121 to 126. The equipment abnormality monitor part 112 monitors whether or not an abnormality in an equipment, a quality, a safety, or the like has been resolved. The countermeasure monitor part 113 monitors whether or not a countermeasure in response to an equipment abnormality or the like has been taken.

The operation control apparatus 100 includes a progress abnormality alarm DB 121, a progress abnormality countermeasure request DB 122, a quality abnormality alarm DB 123, a safety abnormality alarm DB 124, an equipment abnormality alarm DB 125, and an equipment abnormality countermeasure request DB 126.

The progress abnormality alarm DB 121 stores therein information on abnormality in a progress of a process. The quality abnormality alarm DB 123 stores therein information on abnormality in quality. The safety abnormality alarm DB 124 stores therein information on abnormality in safety. The equipment abnormality alarm DB 125 stores therein information on abnormality in an equipment.

The progress abnormality countermeasure request DB 122 stores therein information on countermeasure for the abnormality in progress. The equipment abnormality countermeasure request DB 126 stores therein information on countermeasure for the abnormality in an equipment.

The operation control apparatus 100 includes an alarm information selection DB 127, a priority order definition master DB 128, a countermeasure master DB 129, and a manager calling request DB 130.

The alarm information selection DB 127 stores therein information on which of the DBs 121 to 126 is referenced, when the output device 220 outputs alarm information M which is to be described hereinafter (see FIG. 33 or the like). The priority order definition master DB 128 stores therein information to be referenced by an output processing part 211, when a priority order of the alarm information M to be described hereinafter is displayed. A countermeasure master DB 129 stores therein information to be referenced by the registration processing part 111, when a countermeasure for an abnormality is stored in the progress abnormality countermeasure request DB 122 or the equipment abnormality countermeasure request DB 126. The manager calling request DB 130 stores therein information on a case in which contents of a countermeasure is a calling for a manager.

The department 2 has therein the terminal device 200. The terminal device 200 includes a memory 210, a CPU 201, a communication device 202, and an input device 203. The memory 210 stores therein a program loaded from a storage device not illustrated. The CPU 201 executes the loaded program, which realizes the output processing part 211 that makes the output device 220 output information based on display information transmitted from the operation control apparatus 100.

The output device 220 is realized by a device disposed in accordance with the department 2. For example, the display board 221 is disposed in each of a department "A" 2A and a department "C" 2C as the output device 220. The display board 221 and a speaker 222 are disposed in a department "B" 2B. A tablet terminal may be disposed as the terminal device 200 and the output device 220. In this case, the tablet terminal is equipped with respective functions of the terminal device 200 and the output device 220. When the display board 221 is of touch-screen type, the display board 221 may have a function of the input device 203.

If the department "A" 2A is the department 2 relevant to a progress, a progress monitor device 230 that monitors a state of progress is disposed in the department "A" 2A.

The operation control apparatus 100 and each of the terminal devices 200: are connected to each other via a network N such as a LAN (Local Area Network); and exchange information.

<Visualization of State of Occurrence of Abnormality>

(Registration of Occurrence and Resolution of Abnormality: In Case of Registration by User)

Figure 2:
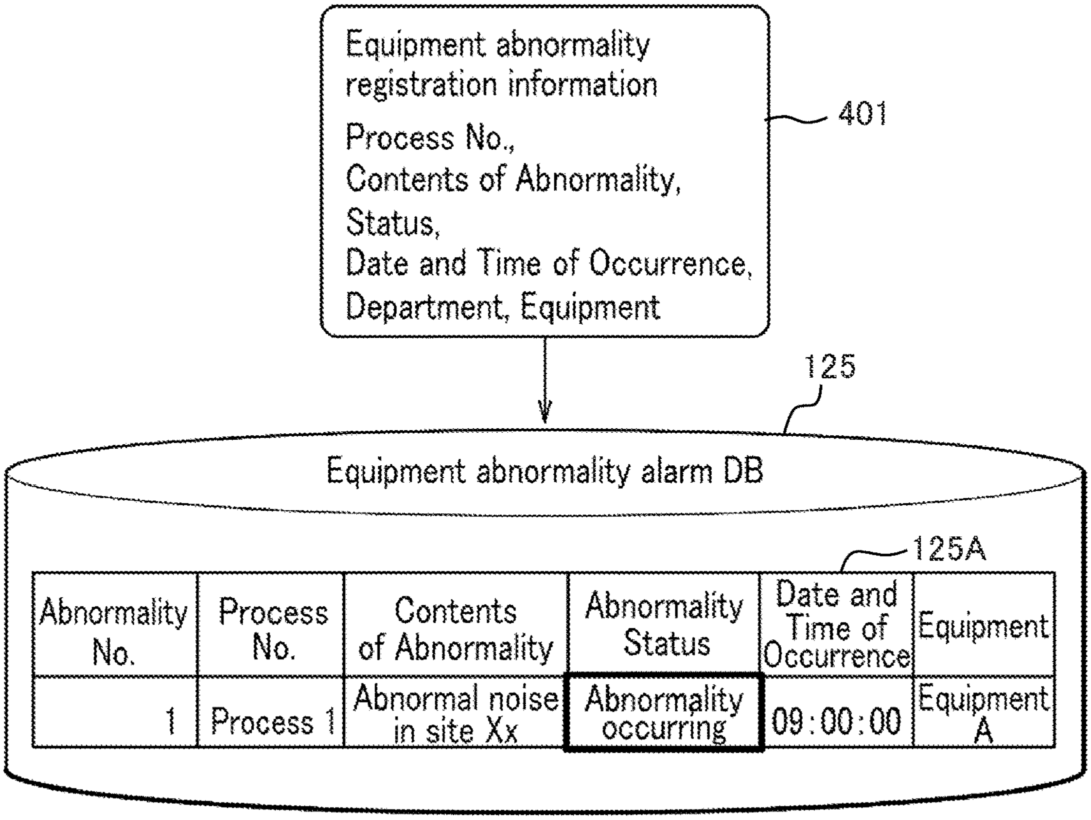
FIG. 2 is a diagram illustrating a procedure for registering occurrence of an abnormality in a equipment abnormality alarm DB.

FIG. 2 is a diagram illustrating a procedure for registering occurrence of an abnormality in the equipment abnormality alarm DB 125. FIG. 2 illustrates a processing performed when a user recognizes an abnormality in an equipment.

When a user recognizes an abnormality in an equipment, the user inputs equipment abnormality registration information 401 via the input device 203 of the terminal device 200. As illustrated in FIG. 2, the equipment abnormality registration information 401 contains therein: "Process No." which is uniquely assigned to a process; "Contents of Abnormality" which describes how is an event as an abnormality; "Status" which shows a current state of the abnormality; "Date and Time of Occurrence"; "Department" which shows a department at which the abnormality has occurred; and "Equipment" which shows an equipment at which the abnormality has occurred.

The equipment abnormality registration information 401: is transmitted to the operation control apparatus 100; and is stored in equipment abnormality alarm information 125A held in the equipment abnormality alarm DB 125. As illustrated in the example of FIG. 2, the equipment abnormality alarm information 125A contains therein: "Abnormality No.", "Process No.", "Contents of Abnormality", "Abnormality Status", "Date and Time of Occurrence", and "Equipment". Though not illustrated, the equipment abnormality alarm information 125A also contains therein "Date and Time of Abnormality Resolved" which shows a date and time at which the abnormality in the equipment has been resolved. The registration processing part 111 of the operation control apparatus 100 having received the equipment abnormality registration information 401 creates "Abnormality No.". The registration processing part 111 then stores the created "Abnormality No." in a column of "Abnormality No." of the equipment abnormality alarm information 125A; and stores appropriate information of the equipment abnormality registration information 401 in the equipment abnormality alarm information 125A. That is, the registration processing part 111 stores "Process No." of the equipment abnormality registration information 401 in a column of "Process No." of the equipment abnormality alarm information 125A. Similarly, the registration processing part 111 stores "Contents of Abnormality" of the equipment abnormality registration information 401 in a column of "Contents of Abnormality" of the equipment abnormality alarm information 125A; and stores "Status" of the equipment abnormality registration information 401 in a column of "Abnormality Status" of the equipment abnormality alarm information 125A. The registration processing part 111 stores "Date and Time of Occurrence" of the equipment abnormality registration information 401 in a column of "Date and Time of Occurrence" of the equipment abnormality alarm information 125A. The registration processing part 111 stores "Equipment" of the equipment abnormality registration information 401 in a column of "Equipment" of the equipment abnormality alarm information 125A.

In the example illustrated in FIG. 2, information of "Abnormality occurring" is stored in the column of "Abnormality Status" of the equipment abnormality alarm information 125A (the thick framed).

The registration processing part 111 stores information similar to the described above also in equipment abnormality countermeasure request information 126A stored in the equipment abnormality countermeasure request DB 126 (to be described hereinafter with reference to FIG. 17).

Figure 3:
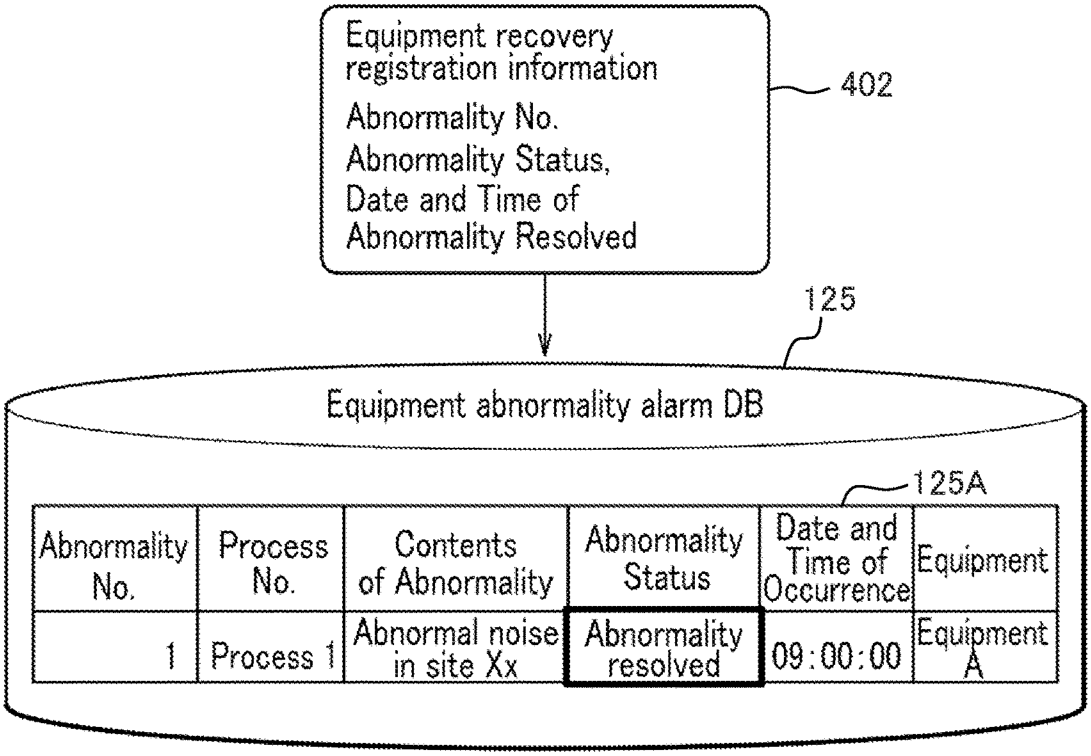
FIG. 3 is a diagram illustrating a procedure for registering resolution of the abnormality in the equipment abnormality alarm DB.

FIG. 3 is a diagram illustrating a procedure for registering resolution of an abnormality in the equipment abnormality alarm DB 125. With reference to FIG. 3, a processing performed when a user recognizes that an abnormality in an equipment has been resolved is described.

When a user recognizes that an abnormality in an equipment has been resolved, the user inputs equipment recovery registration information 402 via of the input device 203 of the terminal device 200. As illustrated in FIG. 2, the equipment abnormality registration information 401 contains therein: "Abnormality No."; "Status" which shows a current state; and "Date and Time of Abnormality Resolved" which is a date and time at which the abnormality has been resolved.

As illustrated in FIG. 3, the equipment recovery registration information 402 is stored in the equipment abnormality alarm information 125A which has been transmitted to the operation control apparatus 100 and has been held in the equipment abnormality alarm DB 125. The registration processing part 111 of the operation control apparatus 100 having received the equipment recovery registration information 402 stores appropriate information of the equipment recovery registration information 402 in the equipment abnormality alarm information 125A, using "Abnormality No." of the equipment recovery registration information 402 as a key. That is, the registration processing part 111 stores "Status" of the equipment recovery registration information 402 in a column of "Abnormality Status" of the equipment abnormality alarm information 125A. The registration processing part 111 stores "Date and Time of Abnormality Resolved" of the equipment recovery registration information 402 in a column (not illustrated) of "Date and Time of Abnormality Resolved" of the equipment abnormality alarm information 125A. Note that in the example illustrated in FIG. 3, information of "Abnormality resolved" is stored in the column of "Abnormality Status" of the equipment abnormality alarm information 125A (see the thick framed).

(Registration of Occurrence/Resolution of Abnormality: Case of Automatic Registration)

Figure 4:
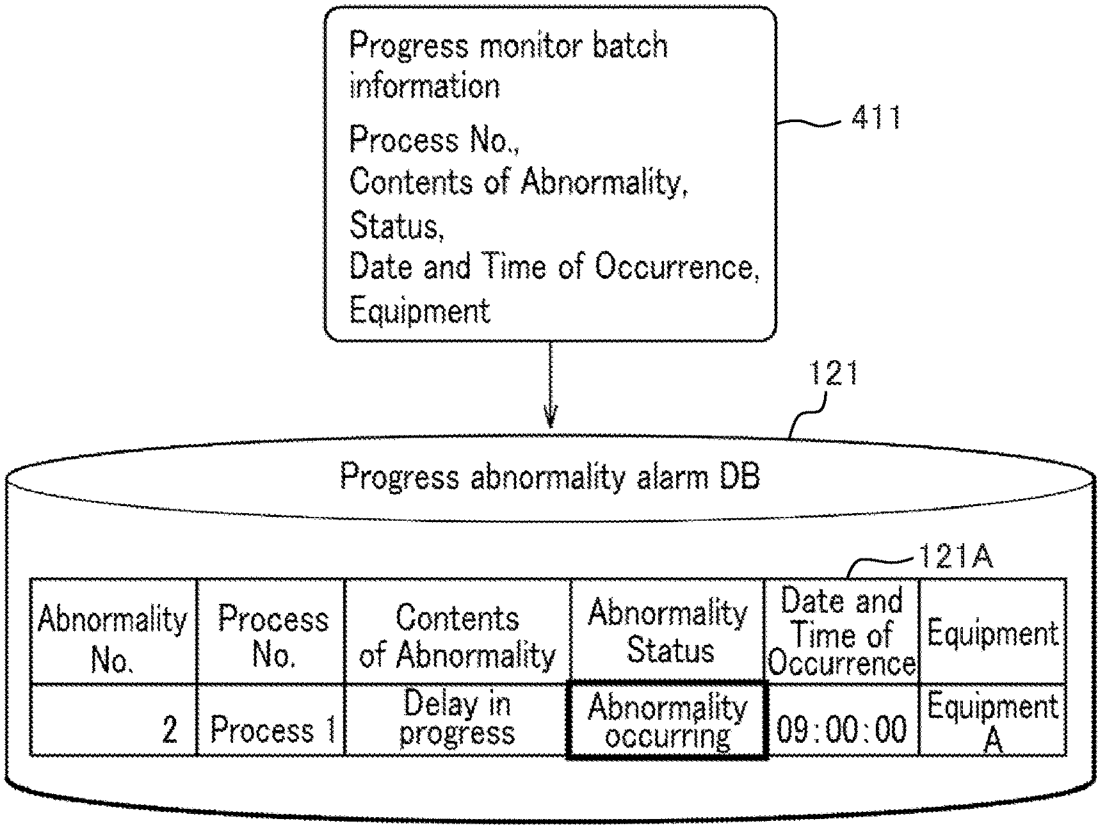
FIG. 4 is a diagram illustrating a procedure for registering occurrence of an abnormality in a progress abnormality alarm DB.
Figure 5:
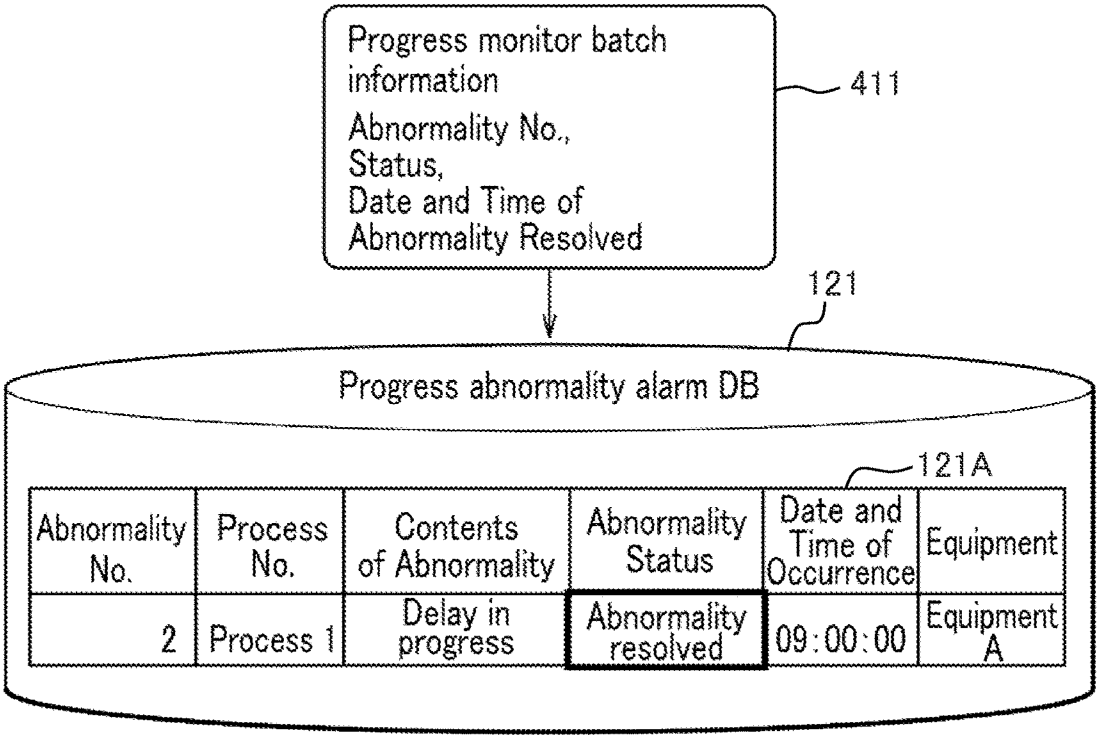
FIG. 5 is a diagram illustrating a procedure for registering resolution of the abnormality in the progress abnormality alarm DB.

FIG. 4 is a diagram illustrating a procedure for registering occurrence of an abnormality in the progress abnormality alarm DB 121. With reference to FIG. 4, a processing of an automatic registration of an abnormality in progress performed by a control system is described. Note that description in FIG. 4 and FIG. 5 is made assuming that an abnormality has occurred in progress.

As a start, the progress monitor device 230 detects a delay in progress. The delay in progress is detected when, for example, the progress monitor device 230 detects, while monitoring on a regular basis, that the number N of products scheduled to be produced by a predetermined time has not been actually achieved at the predetermined time. The progress monitor device 230: compares a reference (a plan) with an actual achievement; and, if a difference therebetween exceeds a prescribed threshold, thereby detects a delay in progress.

Upon recognition of the delay in progress, the progress monitor device 230 inputs the progress monitor batch information 411. As illustrated in FIG. 4, the progress monitor batch information 411 contains therein: "Process No."; "Contents of Abnormality" which shows an event as an abnormality; "Status" which shows a current state; "Date and Time of Occurrence"; and "Equipment".

The progress monitor batch information 411: is transmitted to the operation control apparatus 100; and is stored in the progress abnormality alarm information 121A held in the progress abnormality alarm DB 121. As illustrated in the example of FIG. 4, the progress abnormality alarm information 121A contains therein "Abnormality No.", "Process No.", "Contents of Abnormality", "Abnormality Status", "Date and Time of Occurrence", and "Equipment". Though not illustrated, the progress abnormality alarm information 121A also contains therein "Date and Time of Abnormality Resolved" which shows a date and time at which the delay in progress has been resolved. The registration processing part 111 of the operation control apparatus 100 having received the progress monitor batch information 411 firstly creates "Abnormality No.". The registration processing part 111 then: stores the created "Abnormality No." in a column of "Abnormality No." of the progress abnormality alarm information 121A; and stores appropriate information of the progress monitor batch information 411 in the progress abnormality alarm information 121A. That is, the registration processing part 111 stores "Process No." of the progress monitor batch information 411 in a column of "Process No." of the progress abnormality alarm information 121A. Similarly, the registration processing part 111: stores "Contents of Abnormality" of the progress monitor batch information 411 in a column of "Contents of Abnormality" of the progress abnormality alarm information 121A; and also stores "Status" of the progress monitor batch information 411 in a column of "Abnormality Status" of the progress abnormality alarm information 121A. The registration processing part 111 stores "Date and Time of Occurrence" of the progress monitor batch information 411 in a column of "Date and Time of Occurrence" of the progress abnormality alarm information 121A. The registration processing part 111 stores "Equipment" of the progress monitor batch information 411 in a column of "Equipment" of the progress abnormality alarm information 121A.

Note that in the example illustrated in FIG. 2, information of "Abnormality occurring" is stored in the column of "Abnormality Status" of the progress abnormality alarm information 121A (see the thick framed).

Note that the registration processing part 111 stores information similar to the described above also in the progress abnormality countermeasure request DB 122, which is to be described hereinafter.

FIG. 5 is a diagram illustrating a procedure for registering resolution of the abnormality in the progress abnormality alarm DB 121. With reference to FIG. 5, a processing performed when the progress monitor device 230 has recognized resolution of a delay in progress is described.

When the progress monitor device 230 recognizes that a delay in progress has been resolved, the progress monitor device 230 creates the progress monitor batch information 411. As illustrated in FIG. 5, the progress monitor batch information 411 contains therein "Abnormality No.", "Status", and "Date and Time of Abnormality Resolved". "Date and Time of Abnormality Resolved" is a date and time at which the delay in progress has been resolved.

The progress monitor batch information 411 is stored in the progress abnormality alarm information 121A which has been transmitted to the operation control apparatus 100 and has then been held in the progress abnormality alarm DB 121. The registration processing part 111 of the operation control apparatus 100 having received the progress monitor batch information 411 stores appropriate information of the progress monitor batch information 411 in the progress abnormality alarm information 121A, using "Abnormality No." of the progress monitor batch information 411 as a key. That is, the registration processing part 111 stores "Status" of the progress monitor batch information 411 in the column of "Status" of the progress abnormality alarm information 121A. The registration processing part 111 stores "Date and Time of Abnormality Resolved" of the progress monitor batch information 411 in a column (not illustrated) of "Date and Time of Abnormality Resolved" of the progress abnormality alarm information 121A. Note that in the example illustrated in FIG. 3, information of "Abnormality resolved" is stored in the column of "Abnormality Status" of the progress abnormality alarm information 121A (see the thick framed).

(Updating of Degree of Abnormality: Case of Abnormality in Equipment)

Figure 6:
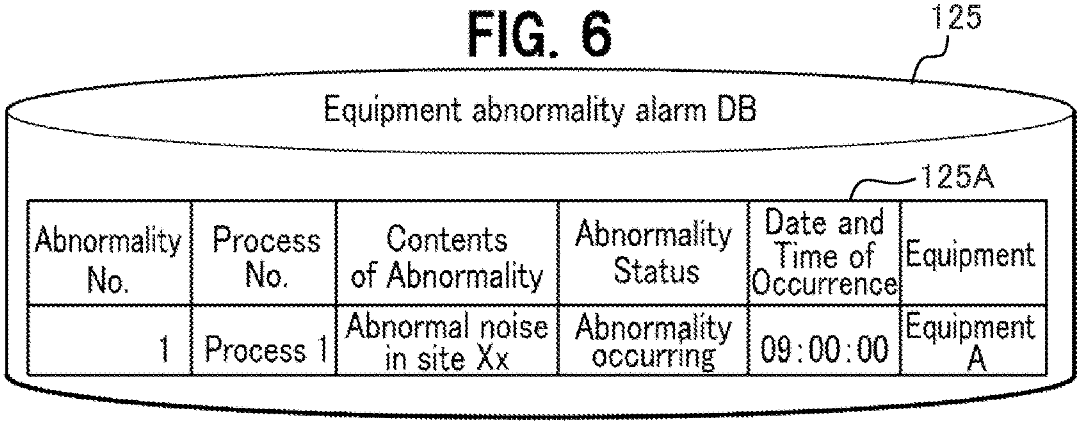
FIG. 6 is a diagram (1) for explaining updating of a degree of an abnormality in a case of abnormality in an equipment.
Figure 7:
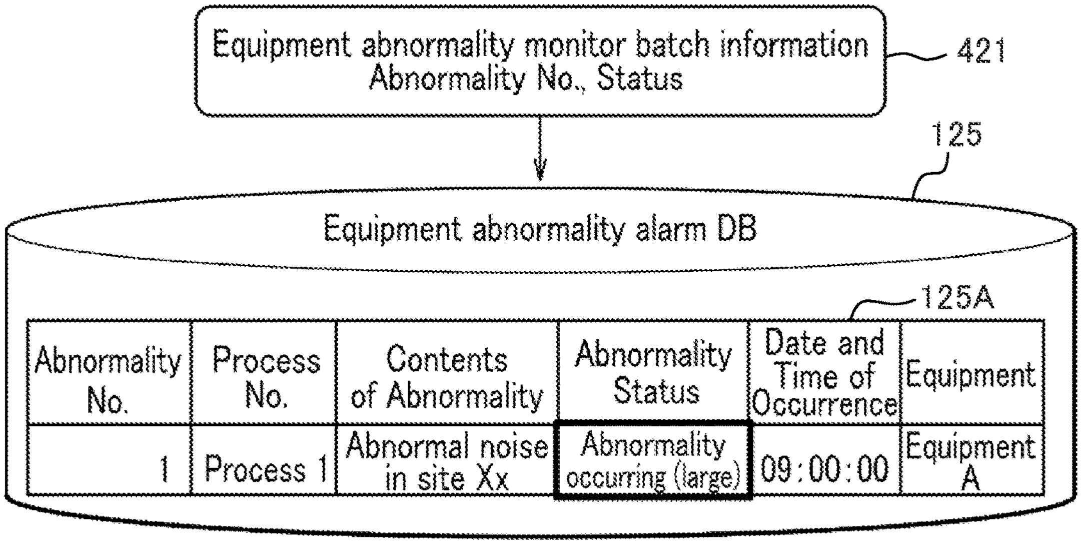
FIG. 7 is a diagram (2) for explaining updating of the degree of the abnormality in the case of abnormality in the equipment.
Figure 8:
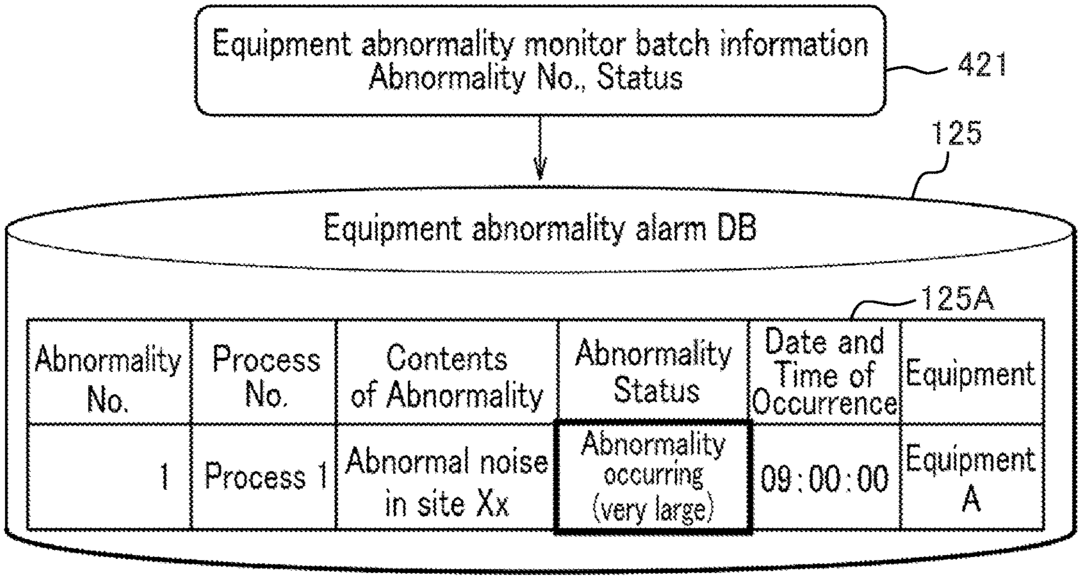
FIG. 8 is a diagram (3) for explaining updating of the degree of the abnormality in the case of abnormality in the equipment.

Next is described updating of a degree of abnormality when an abnormality has occurred in an equipment with reference to FIG. 6 to FIG. 8.

The equipment abnormality alarm information 125A of the equipment abnormality alarm DB 125 illustrated in FIG. 6 is the same as the equipment abnormality alarm information 125A illustrated in FIG. 3.

The equipment abnormality monitor part 112 determines whether or not the equipment recovery registration information 402 (FIG. 3) has been transmitted. When the equipment recovery registration information 402 is not transmitted even after a prescribed first time period has passed starting from a date and time of occurrence, the equipment abnormality monitor part 112 transmits the equipment abnormality monitor batch information 421 as illustrated in FIG. 7 to the registration processing part 111. As illustrated in FIG. 7, the equipment abnormality monitor batch information 421 contains therein information of "Abnormality No." and "Status". "Status" herein contains information of "Abnormality occurring (large)".

The registration processing part 111: searches the equipment abnormality alarm information 125A using "Abnormality No." of the equipment abnormality monitor batch information 421 as a key; and updates a column of "Abnormality status" in a record corresponding to a result of the search, to "Abnormality occurring (large)" (see the thick framed).

Let us assume a case in which, for example, the column of "Abnormality status" of the equipment abnormality alarm information 125A is updated to "Abnormality occurring (large)", and, even after a prescribed second time period has passed therefrom, the equipment recovery registration information 402 is not transmitted. Then the equipment abnormality monitor part 112 transmits the equipment abnormality monitor batch information 421 as illustrated in FIG. 8 to the registration processing part 111. As illustrated in FIG. 8, the equipment abnormality monitor batch information 421 contains therein information of "Abnormality No." and "Status". Information of "Abnormality occurring (very large)" is herein stored in "Status".

The registration processing part 111: searches the equipment abnormality alarm information 125A, using "Abnormality No." of the equipment abnormality monitor batch information 421 as a key; and updates a column of "Abnormality status" of a record corresponding to a result of the search, to "Abnormality occurring (very large)".

(Updating of Degree of Abnormality: Case of Abnormality in Progress)

Figure 9:
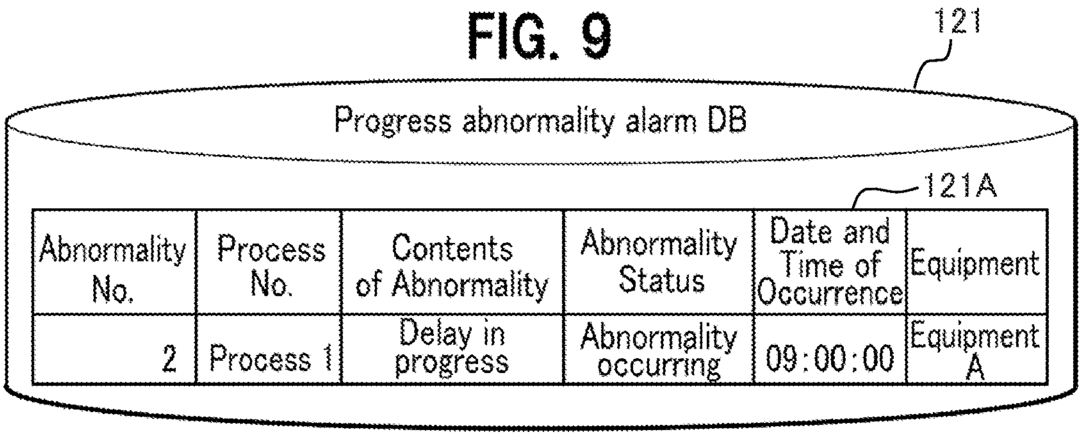
FIG. 9 is a diagram (1) for explaining updating of a degree of an abnormality in a case of abnormality in a progress.
Figure 10:
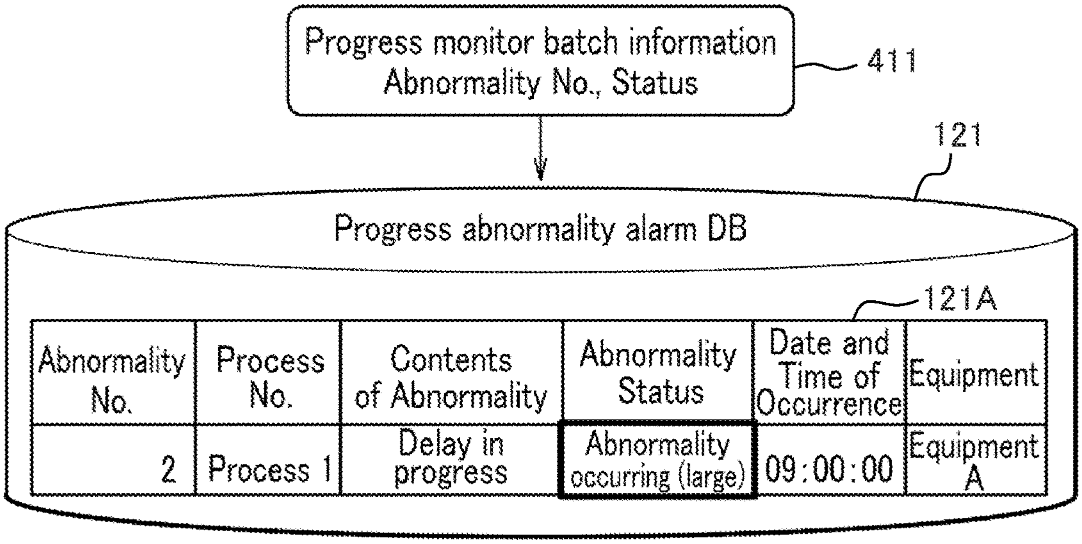
FIG. 10 is a diagram (2) for explaining updating of the degree of the abnormality in the case of abnormality in the progress.
Figure 11:
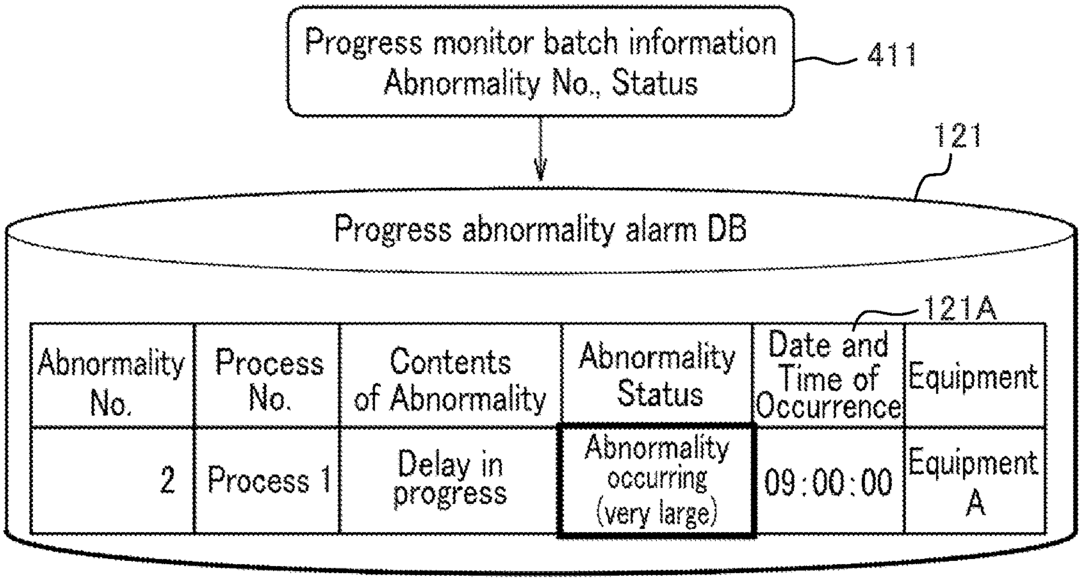
FIG. 11 is a diagram (3) for explaining updating of the degree of the abnormality in the case of abnormality in the progress.

Next is described updating of a degree of an abnormality in progress in a case where an abnormality occurs in progress, with reference to FIG. 9 to FIG. 11.

The progress abnormality alarm information 121A in progress abnormality alarm DB 121 illustrated in FIG. 9 is the same as the progress abnormality alarm information 121A illustrated in FIG. 4.

If a difference in progress becomes wider, the equipment abnormality monitor part 112 transmits the progress monitor batch information 411 as illustrated in FIG. 10 to the registration processing part 111. The terms "a difference in progress becomes wider" used herein mean that a reference (a plan) is compared with an actual achievement and a difference therebetween exceeds a prescribed first threshold. As illustrated in FIG. 10, the progress monitor batch information 411 stores therein information of "Abnormality No." and "Status". Information of "Abnormality occurring (large)" is herein stored in "Status".

The registration processing part 111: searches the progress abnormality alarm information 121A, using "Abnormality No." of the progress monitor batch information 411 as a key; and updates a column of "Abnormality status" in a record corresponding to a result of the search, to "Abnormality occurring (large)" (see the thick framed).

After the column of "Abnormality status" of the progress abnormality alarm information 121A is updated to "Abnormality occurring (large)", if the difference in progress is further widened, the equipment abnormality monitor part 112 transmits the progress monitor batch information 411 as illustrated in FIG. 11 to the registration processing part 111. The terms "the difference in progress is further widened" used herein mean that the reference (the plan) is compared with an actual achievement and a difference therebetween exceeds a prescribed second threshold (>the first threshold). As illustrated in FIG. 11, the progress monitor batch information 411 contains therein information of "Abnormality No." and "Status". Information of "Abnormality occurring (very large)" is herein stored in "Status".

The registration processing part 111: searches the progress abnormality alarm information 121A, using "Abnormality No." of the progress monitor batch information 411 as a key; and updates a column of "Abnormality status" in a record corresponding to a result of the search, to "Abnormality occurring (very large)" (see the thick framed).

The registration processing illustrated in FIG. 2 to FIG. 11 is performed also to the quality abnormality alarm DB 123 and the safety abnormality alarm DB 124.

(Abnormality Occurrence Alarm Display)

Next is described an example of an abnormality occurrence alarm display with reference to FIG. 12 to FIG. 16. Note that each of FIG. 12 to FIG. 16 illustrates a case of an abnormality in equipment as an example. The display can also be, however, applied to a case of an abnormality in progress.

Figure 12:
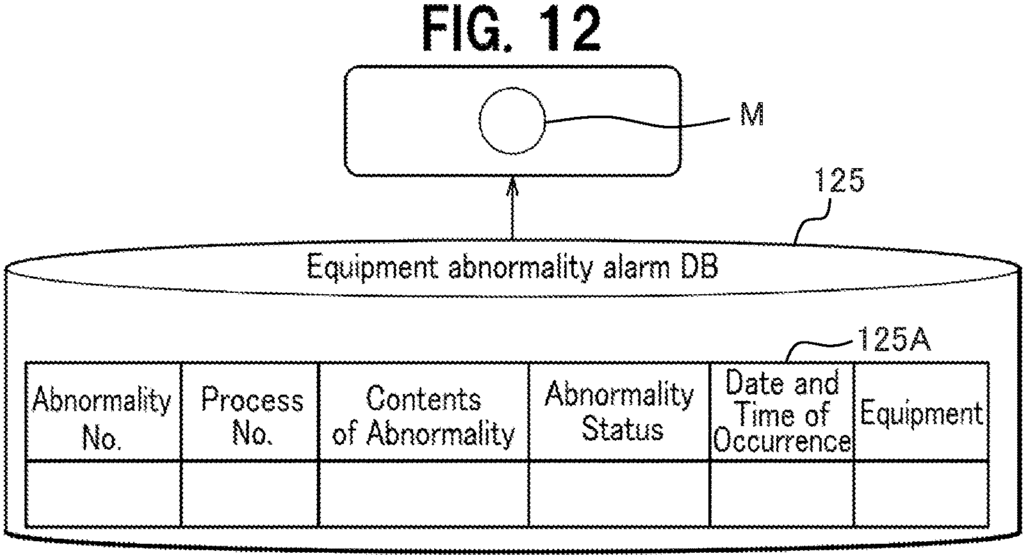
FIG. 12 is a diagram (1) illustrating an example of an abnormality occurrence alarm display.

FIG. 12 illustrates a state in which no information is registered in the equipment abnormality alarm information 125A held in the equipment abnormality alarm DB 125. That is, FIG. 12 illustrates a state in which an abnormality in equipment has not occurred. In this case, the output processing part 211 makes the display board 221 display the alarm information M represented by a green circle (in FIG. 12, represented as a thin solid circle) indicating that an abnormality has not occurred in an equipment. Such a display of the alarm information M described above is herein referred to as "Normality display".

Figure 13:
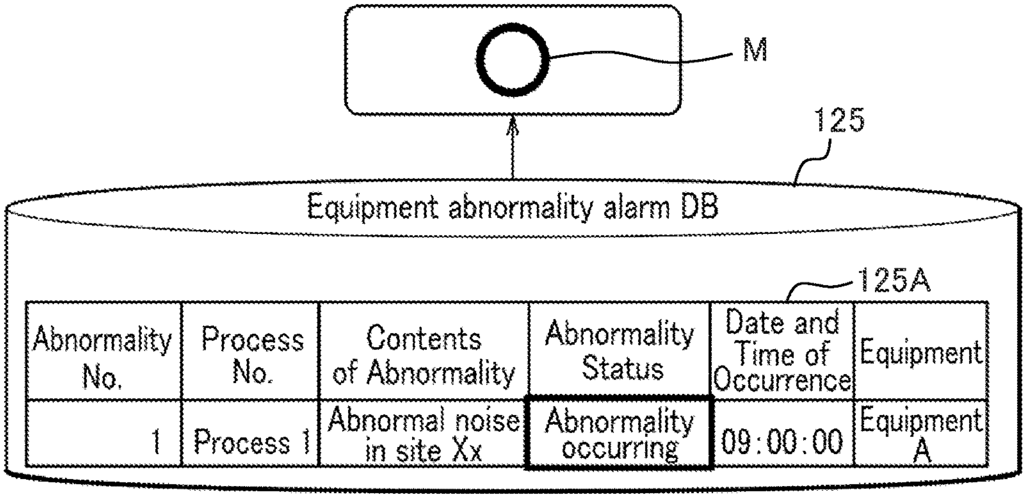
FIG. 13 is a diagram (2) illustrating an example of the abnormality occurrence alarm display.

FIG. 13 illustrates the equipment abnormality alarm information 125A when an abnormality has occurred in an equipment, as illustrated in FIG. 2. In FIG. 13, "Abnormality occurring" is registered in a column of "Abnormality status" of the equipment abnormality alarm information 125A, similarly to FIG. 2. In this case, as illustrated in FIG. 13, the output processing part 211 makes the display board 221 display the alarm information M of a red circle (in FIG. 13, represented as a bold solid circle) indicating that an abnormality has occurred. Such a display of the alarm information M described above is herein referred to as "Abnormality display (small)".

Figure 14:
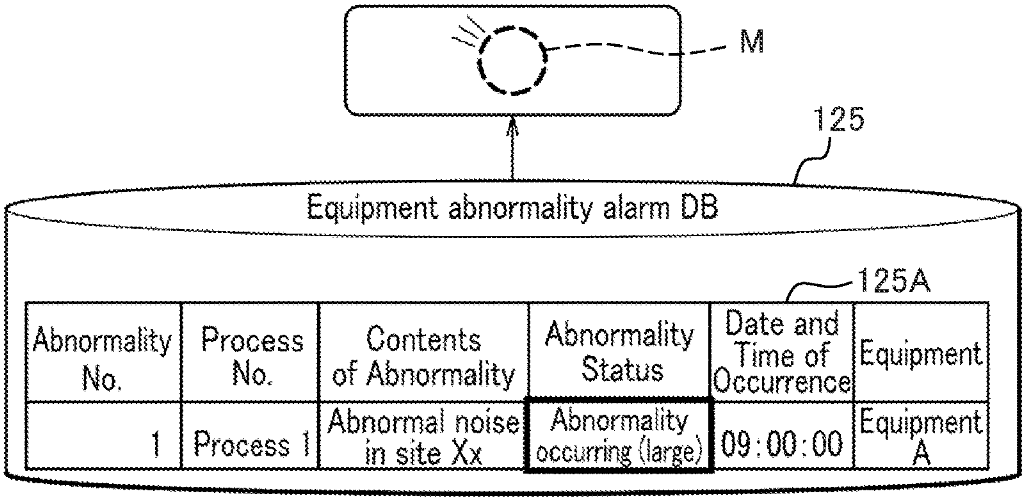
FIG. 14 is a diagram (3) illustrating an example of the abnormality occurrence alarm display.

FIG. 14 illustrates the equipment abnormality alarm information 125A when an abnormality in an equipment has not been resolved even after a first time period has passed, as illustrated in FIG. 7. In FIG. 14, "Abnormality occurring (large)" is registered in a column of "Abnormality status" of the equipment abnormality alarm information 125A, similarly to FIG. 7. In this case, as illustrated in FIG. 14, the output processing part 211 makes the display board 221 display the alarm information M of a blinking red circle (in FIG. 14, represented as a bold broken circle with three lines upper left thereof) indicating that the first time period has passed after the abnormality occurred. Such a display of the alarm information M described above is herein referred to as "Abnormality display (large)".

FIG. 15 illustrates the equipment abnormality alarm information 125A when a second time period has passed after the column of "Abnormality status" of the equipment abnormality alarm information 125A is updated to "Abnormality status (large)", and an abnormality in an equipment of interest is not yet resolved, as illustrated in FIG. 8. In FIG. 15, "Abnormality status (very large)" is registered in the column of "Abnormality status" of the equipment abnormality alarm information 125A, similarly to FIG. 8. In this case, as illustrated in FIG. 15, the output processing part 211 makes the display board 221 display a high-frequency blinking red circle (In FIG. 14, represented as a bold broken circle with three lines upper left and right thereof) indicating that the second time period has passed after the abnormality occurred. Such a display of the alarm information M described above is herein referred to as "Abnormality display (very large)".

FIG. 16 illustrates the equipment abnormality alarm information 125A when the abnormality in equipment has resolved, FIG. 3. In FIG. 16, "Abnormality resolved" is registered in a column of "Abnormality status" of the equipment abnormality alarm information 125A, similarly to FIG. 3. In this case, as illustrated in FIG. 16, the output processing part 211 makes the display board 221 display the alarm information M of a green circle (in FIG. 16, represented as a thin solid line) indicating that an abnormality has not occurred. As described above, such a display of the alarm information M is herein referred to as "Normality display".

A user can customize how the alarm information M of respective different types such as "Normality display", "Abnormality display (small)", "Abnormality display (large)", and "Abnormality display (very large)" is displayed.

As described above, in this embodiment, a degree of an abnormality such as that in an equipment is highlighted in color, blink, or the like, of a circle. This makes it possible to let a user know occurrence of an abnormality or a state of the occurrence of an abnormality such as a degree of the abnormality.

Note that the display board 221 herein displays the alarm information M. Instead, an alarm may be issued using noise from the speaker 222. In this case, a type or a length of noise may be differently designed depending on information stored in the column of "Abnormality status" of the equipment abnormality alarm information 125A.

<Visualization of State of Countermeasure>

(Registration of Request for Countermeasure)

Next is described registration of a request for a countermeasure in response to an abnormality occurred with reference to FIG. 17 to FIG. 20. Note that in each of FIG. 17 to FIG. 20, an example of a request for a countermeasure in response to an abnormality in an equipment is described. In response to other abnormality, a similar processing is performed.

In FIG. 17, when a user recognizes an abnormality in an equipment, the user transmits the equipment abnormality registration information 401 to the operation control apparatus 100 via the input device 203 of the terminal device 200. The transmitted equipment abnormality registration information 401 is the same as that transmitted in FIG. 2. In this step, however, only "Process No." may be contained in the equipment abnormality registration information 401.

The registration processing part 111 of the operation control apparatus 100 having received the equipment abnormality registration information 401 stores information on a countermeasure in the equipment abnormality countermeasure request information 126A of the equipment abnormality countermeasure request DB 126, based on the received equipment abnormality registration information 401 and countermeasure master information 129A (see FIG. 18) stored in the countermeasure master DB 129. That is, the countermeasure master information 129A is created based on past results of countermeasures performed.

As illustrated in FIG. 17, the equipment abnormality countermeasure request information 126A contains therein "Request No.", "Parent No.", "Abnormality No.", "Process No.", "Department", "Request Status", "Contents of Request", "Proposed Countermeasure", "Contents of Countermeasure", "Date and Time of Occurrence", "Date and Time of Planned Completion", "Date and Time of Update", "Date and Time of Completion", and "Equipment". "Date and Time of Occurrence" is herein a date and time at which an abnormality has occurred in the equipment.

FIG. 18 is a diagram illustrating an example of the countermeasure master information 129A stored in the countermeasure master DB 129.

The countermeasure master information 129A contains therein "Process No.", "Equipment", "Contents of Abnormality", "Contents of Countermeasure", and "Number of Times". The countermeasure master information 129A is created based on the column of "Contents of Countermeasure" of the equipment abnormality countermeasure request information 126A.

"Process No." is information similar to "Process No." of the equipment abnormality alarm information 125A or the equipment abnormality countermeasure request information 126A. "Equipment" contains a name of an equipment in which an abnormality has occurred. "Contents of Abnormality" contains contents of the abnormality occurred. "Contents of Countermeasure" contains a countermeasure performed in response to "Contents of Abnormality". "Number of Times" contains the number of times the countermeasure stored in "Contents of Countermeasure" has been performed.

The registration processing part 111 having received the equipment abnormality registration information 401 illustrated in FIG. 17: searches the countermeasure master information 129A illustrated in FIG. 18, using "Process No.", "Contents of Abnormality", "Equipment", or the like, of the equipment abnormality registration information 401 as a key: and extracts "Contents of Countermeasure" having the largest "Number of Times" from among one or more "Contents of Countermeasures" as a result of the search. In the example illustrated in each of FIG. 17 and FIG. 18, "Component replacement in site Xx" is extracted. The registration processing part 111 stores the extracted "Contents of Countermeasure" in a column of "Proposed Countermeasure" of the equipment abnormality countermeasure request information 126A. The registration processing part 111 also stores a date and time at which a record of the equipment abnormality countermeasure request information 126A has been updated, in a column of "Date and Time of Update".

FIG. 19 is a diagram illustrating an example of registration in the equipment abnormality countermeasure request information 126A, in which, when a department at which an abnormality has occurred cannot take an appropriate countermeasure by itself, the department makes a request to other department for the countermeasure. For example, a department of production intends to take a countermeasure for an abnormality in an equipment and cannot do it by itself and then makes a request to a department of maintenance for the countermeasure.

When, for example, a user in a department determines that the department itself cannot take a countermeasure for maintenance in response to an abnormality in an equipment, the user transmits maintenance request information 431 as illustrated in FIG. 19 to the operation control apparatus 100 via the terminal device 200. The maintenance request information 431 contains therein "Request No.", "Department in Charge" showing a request destination, "Status" showing a state of maintenance, and "Date and Time of Request". The user selects "Department in Charge" as the request destination. The operation control apparatus 100 may select, however, an available department.

The registration processing part 111 of the operation control apparatus 100 having received the maintenance request information 431 creates a record of the equipment abnormality countermeasure request information 126A stored in the equipment abnormality countermeasure request DB 126 (a record R1). The registration processing part 111 then stores "4" as a newly created request No. in a column of "Request No." of the created record R1. The registration processing part 111 copies information in columns of "Abnormality No.", "Process No.", "Department", "Request Status", "Contents of Request", "Proposed Countermeasure", "Contents of Countermeasure", "Date and Time of Occurrence", "Date and Time of Planned Completion", "Date and Time of Update", "Date and Time of Completion", and "Equipment" in a record R2 which is a parent record of the record R1, into respective corresponding columns in the record R1. Note that in the example of FIG. 19, the columns of "Contents of Countermeasure", "Date and Time of Planned Completion", and "Date and Time of Completion" in the record R2 are blank and the respective corresponding columns in the record R1 are also blank.

The registration processing part 111 updates the column of "Department" in the record R1, using information (herein, "Maintenance") stored in "Department in Charge" of the maintenance request information 431. The registration processing part 111 stores a number of "Request No." of the parent record R2 in the column of "Parent No." of the record R1. The registration processing part 111 updates the column of "Request Status" of the record R2 into "Request made".

FIG. 20 is a diagram illustrating an example in which a processing of calling a manager is performed as one of countermeasures in response to an abnormality in an equipment.

When a calling of a manager is required as one of countermeasures in response to an abnormality in an equipment, a user transmits the manager calling information 432 to the operation control apparatus 100 via the terminal device 200. As illustrated in the example of FIG. 20, the manager calling information 432 contains therein: "Process No." which shows a site; "Contents of Request" which shows contents of a request; "Status" which shows a state; "Date and Time of Occurrence" which shows a date and time of the request; and "Department" which shows information on a department to which a manager to be called belongs.

The registration processing part 111 of the operation control apparatus 100 having received the manager calling information 432 stores appropriate information of the manager calling information 432 in the manager calling request information 130A stored in the manager calling request DB 130. The manager calling request information 130A contains columns similar to those of the equipment abnormality countermeasure request information 126A.

The registration processing part 111 of the operation control apparatus 100 having received the manager calling information 432: creates a new record in the manager calling request information 130A; creates a request No.; and stores the created request No. in a column of "Request No." of the manager calling request information 130A. The registration processing part 111 stores appropriate information of "Process No.", "Department", "Status", "Contents of Request", and "Date and Time of Occurrence" of the manager calling information 432, in the columns of "Process No.", "Department", "Request Status", "Contents of Request", and "Date and Time of Occurrence" of the manager calling request information 130A.

In the example illustrated in FIG. 20, "Process 1" is stored in "Process No." of the manager calling request information 130A; "Unconfirmed", in "Request Status"; and, "Manager calling", in "Contents of Request". The registration processing part 111 also stores a date and time at which information is registered (updated) in a record of the manager calling information 432, in a column of "Date and Time of Update".

(Registration of State of Countermeasure in Response to Request for Countermeasure)

Figure 23:
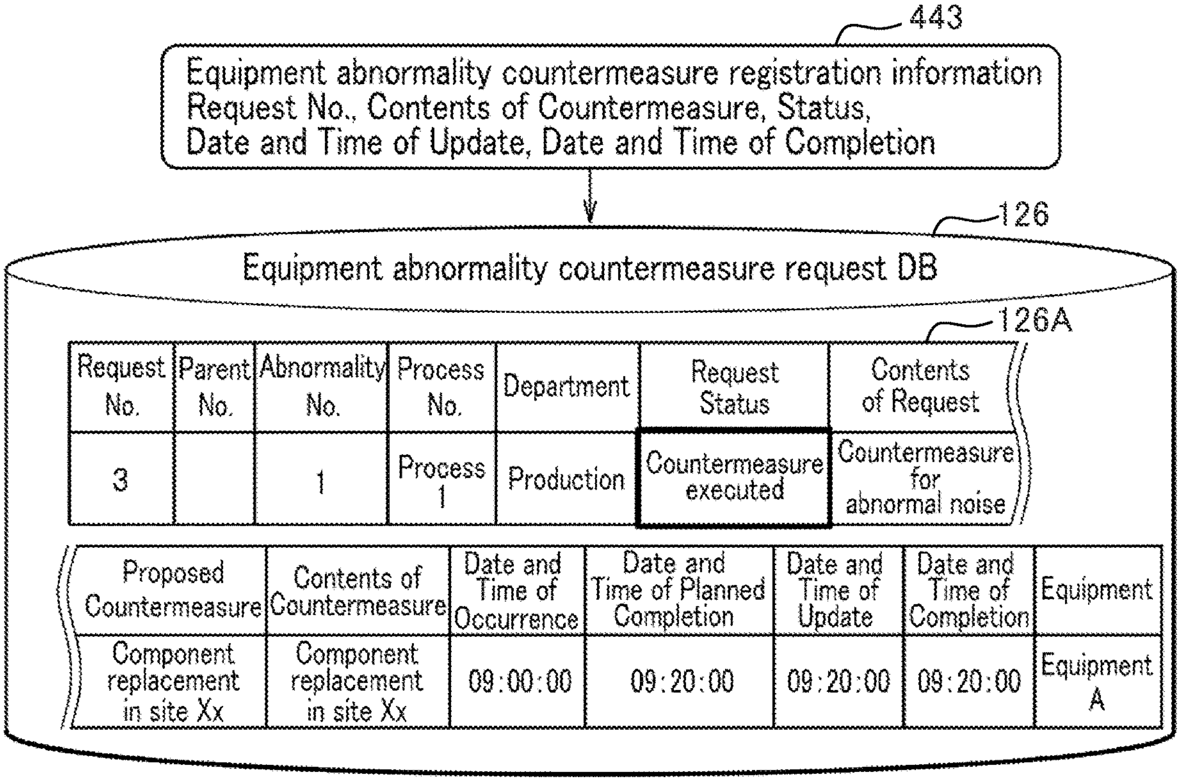
FIG. 23 is a diagram (3) for explaining, in response to the request for the countermeasure, the registration of the state of the countermeasure.

Next is described a registration of a state of a countermeasure in response to a request for a countermeasure with reference to FIG. 21 to FIG. 23. Each of FIG. 21 to FIG. 23 illustrates a processing in response to an abnormality in an equipment. The processing can also be, however, applied to other abnormality.

FIG. 21 illustrates the equipment abnormality countermeasure request information 126A when a request for a countermeasure is made in response to an abnormality in an equipment. That is, the equipment abnormality countermeasure request information 126A illustrated in FIG. 21 includes information same as that of the equipment abnormality countermeasure request information 126A illustrated in FIG. 17.

When a person in charge of a countermeasure for the abnormality in the equipment starts an appropriate countermeasure, the person in charge transmits the equipment abnormality countermeasure registration information 443 to the operation control apparatus 100 via the terminal device 200 as illustrated in FIG. 22. The transmitted equipment abnormality countermeasure registration information 443 contains appropriate information of "Request No.", "Status", "Date and Time of Planned Completion", and "Date and Time of Update". In the example of FIG. 22, "Countermeasure in execution" is stored in "Status"; "9:20:00", in "Date and Time of Planned Completion"; and, "9:10:00", in "Date and Time of Update".

The operation control apparatus 100 having received the equipment abnormality countermeasure registration information 443 searches the equipment abnormality countermeasure request information 126A stored in the equipment abnormality countermeasure request DB 126, using "Request No." of the equipment abnormality countermeasure registration information 443 as a key. Based on a result of the search, the registration processing part 111 stores appropriate information of the equipment abnormality countermeasure registration information 443, in an acquired record of the equipment abnormality countermeasure request information 126A. More specifically, the registration processing part 111 stores "Status" ("Countermeasure in execution") of the equipment abnormality countermeasure registration information 443 in a column of "Request Status" of the equipment abnormality countermeasure request information 126A. The registration processing part 111 also stores "Date and Time of Planned Completion" ("9:20:00") and "Date and Time of Update" ("9:10:00") of the equipment abnormality countermeasure registration information 443 in columns of "Date and Time of Planned Completion" and "Date and Time of Update" of the equipment abnormality countermeasure request information 126A, respectively.

FIG. 23 is a diagram illustrating a processing performed when a person in charge has completed the countermeasure for the abnormality in the equipment.

When the person in charge has completed the countermeasure for the abnormality in the equipment, the person in charge transmits the equipment abnormality countermeasure registration information 443 to the operation control apparatus 100 via the terminal device 200. The equipment abnormality countermeasure registration information 443 transmitted herein contains appropriate information in "Request No.", "Contents of countermeasure", "Status", "Date and Time of Update", and "Date and Time of Completion". In the example of FIG. 23, "Component replacement in site Xx" is stored in "Contents of Countermeasure"; and, "Countermeasure executed", in "Status". Similarly, "9:20:00" is stored in "Date and Time of Update"; and, "9:20:00", in "Date and Time of Completion".

The operation control apparatus 100 having received the equipment abnormality countermeasure registration information 443 searches the equipment abnormality countermeasure request information 126A stored in the equipment abnormality countermeasure request DB 126, using "Request No." of the equipment abnormality countermeasure registration information 443 as a key. Based on a result of the search, the registration processing part 111 stores appropriate information of the equipment abnormality countermeasure registration information 443 in an acquired record of the equipment abnormality countermeasure request information 126A. More specifically, the registration processing part 111 stores "Status" ("Countermeasure executed") of the equipment abnormality countermeasure registration information 443 in a column of "Request Status" of the equipment abnormality countermeasure request information 126A. The registration processing part 111 also stores "Contents of Countermeasure" ("Component replacement in site Xx") of the equipment abnormality countermeasure registration information 443 in a column of "Contents of Countermeasure" of the equipment abnormality countermeasure request information 126A. The registration processing part 111 stores "Date and Time of Update" ("9:20:00") of the equipment abnormality countermeasure registration information 443 in a column of "Date and Time of Update" of the equipment abnormality countermeasure request information 126A. The registration processing part 111 stores "Date and Time of Completion" ("9:20:00") of the equipment abnormality countermeasure registration information 443 in a column of "Date and Time of Completion" of the equipment abnormality countermeasure request information 126A.

When a countermeasure is requested to other department and is completed thereby, as illustrated in FIG. 19, the registration processing part 111 updates a column of "Request Status" of a requestor to "Countermeasure executed", based on a number stored in "Parent No." of the equipment abnormality countermeasure request information 126A.

(Monitor of Unattended State for Request for Countermeasure)

Next is described a processing performed when an abnormality in an equipment is left unattended without a request for a countermeasure, with reference to FIG. 24 and FIG. 25. That is, each of FIG. 24 and FIG. 25 illustrates an example in which "Request Status" of the equipment abnormality countermeasure request information 126A is left unattended for a prescribed period of time, while keeping "Unconfirmed".

FIG. 24 is a diagram illustrating the equipment abnormality countermeasure request information 126A when a request for a countermeasure in response to an abnormality in an equipment is made. That is, the equipment abnormality countermeasure request information 126A illustrated in FIG. 24 has information same as that of the equipment abnormality countermeasure request information 126A illustrated in FIG. 17.

The countermeasure monitor part 113 monitors at regular intervals whether or not "Request Status" of the equipment abnormality countermeasure request information 126A continues to be "Unconfirmed" and, at the same time, whether or not a current time is beyond a time registered in a column of "Date and Time of Occurrence".

When the current time is beyond the scheduled time for a countermeasure without any request being made as illustrated in FIG. 22, then the countermeasure monitor part 113: creates the countermeasure request monitor batch information 434 as illustrated in FIG. 25; and transmits the created countermeasure request monitor batch information 434 to the registration processing part 111. As illustrated in FIG. 25, the countermeasure request monitor batch information 434 contains "Request No." and "Status". "Status" of the countermeasure request monitor batch information 434 herein contains "Unconfirmed [unattended]".

The registration processing part 111 having received the countermeasure request monitor batch information 434 searches a record of the equipment abnormality countermeasure request information 126A, using "Request No." stored in the countermeasure request monitor batch information 434 as a key. The registration processing part 111 stores appropriate information of "Status" of the countermeasure request monitor batch information 434 in a column of "Request Status" in the searched record. As illustrated in FIG. 25, "Unconfirmed [unattended]" is herein stored in a column of "Request Status" of the equipment abnormality countermeasure request information 126A.

(Monitor of No-Action State for Request for Countermeasure)

Next is described a processing performed when, though a person in charge has already taken a countermeasure in response to an abnormality in an equipment, the abnormality continues to be unattended, even after a scheduled date and time for countermeasure has passed, with reference to FIG. 26 and FIG. 27.

FIG. 26 is a diagram illustrating equipment abnormality countermeasure request information 126A when a countermeasure for the abnormality in the equipment has already started. That is, the equipment abnormality countermeasure request information 126A illustrated in FIG. 26 has information same as that of the equipment abnormality countermeasure request information 126A illustrated in FIG. 22.

The countermeasure monitor part 113 monitors at regular intervals whether or not "Request Status" of the equipment abnormality countermeasure request information 126A is "Countermeasure in execution" and, at the same time, whether or not a current time is beyond a time registered in a column of "Date and Time of Planned Completion" of the equipment abnormality countermeasure request information 126A.

When "Request Status" of the equipment abnormality countermeasure request information 126A is "Countermeasure in execution", and, at the same time, the current time is beyond the time registered in the column of "Date and Time of Planned Completion" of the equipment abnormality countermeasure request information 126A, then the countermeasure monitor part 113: creates the countermeasure request monitor batch information 434 as illustrated in FIG. 27; and transmits the created countermeasure request monitor batch information 434 to the registration processing part 111. The current time is compared with the scheduled date and time for countermeasure by monitoring at regular intervals. As illustrated in FIG. 27, the countermeasure request monitor batch information 434 contains therein "Request No." and "Status". "Unconfirmed [unattended]" is herein stored in "Status" of the countermeasure request monitor batch information 434.

The registration processing part 111 having received the countermeasure request monitor batch information 434 searches a record of the equipment abnormality countermeasure request information 126A, using "Request No." stored in the countermeasure request monitor batch information 434 as a key. The registration processing part 111 stores appropriate information of "Status" of the countermeasure request monitor batch information 434 in a column of "Request Status" in the searched record. As illustrated in FIG. 27, "Countermeasure in execution [unattended]" is herein stored in the column of "Request Status" of the equipment abnormality countermeasure request information 126A.

(Display of State of Countermeasure)

Next is described an example of an abnormality occurrence alarm display with reference to FIG. 28 to FIG. 32. Note that each of FIG. 28 to FIG. 32 illustrates a case of an abnormality in an equipment as an example. The display can also be, however, applied to a case of other abnormality.

Figure 28:
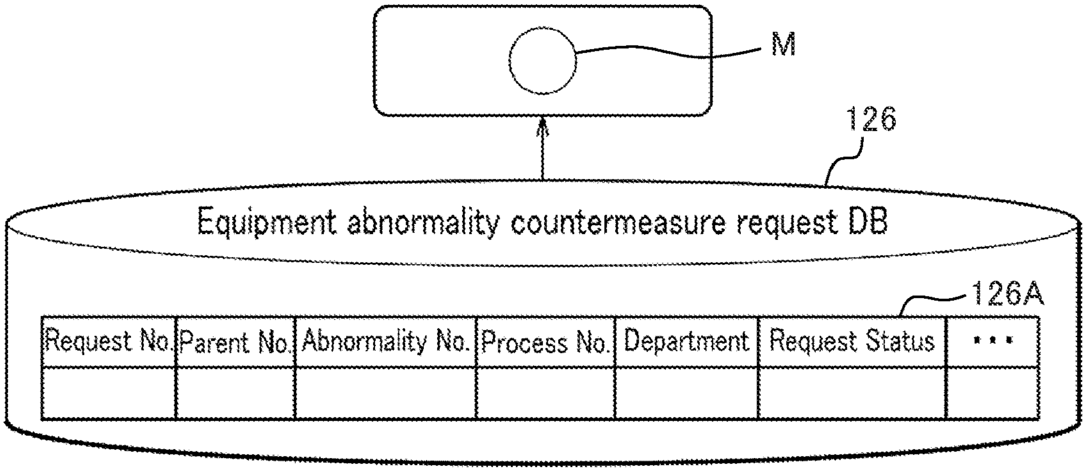
FIG. 28 is a diagram (1) illustrating an example of an abnormality occurrence alarm display.

FIG. 28 illustrates a state in which no information is registered in the equipment abnormality countermeasure request information 126A held in the equipment abnormality countermeasure request DB 126. That is, FIG. 28 illustrates a state in which an abnormality in equipment has not occurred. In this case, the output processing part 211 makes the display board 221 display alarm information M represented by a green circle (in FIG. 28, represented as a thin solid circle) indicating that an abnormality has not occurred. Such a display of the alarm information M described above is herein referred to as "Normality display". Note that in each of FIG. 28 to FIG. 32, only some columns necessary for description are illustrated in the equipment abnormality countermeasure request information 126A.

Figure 29:
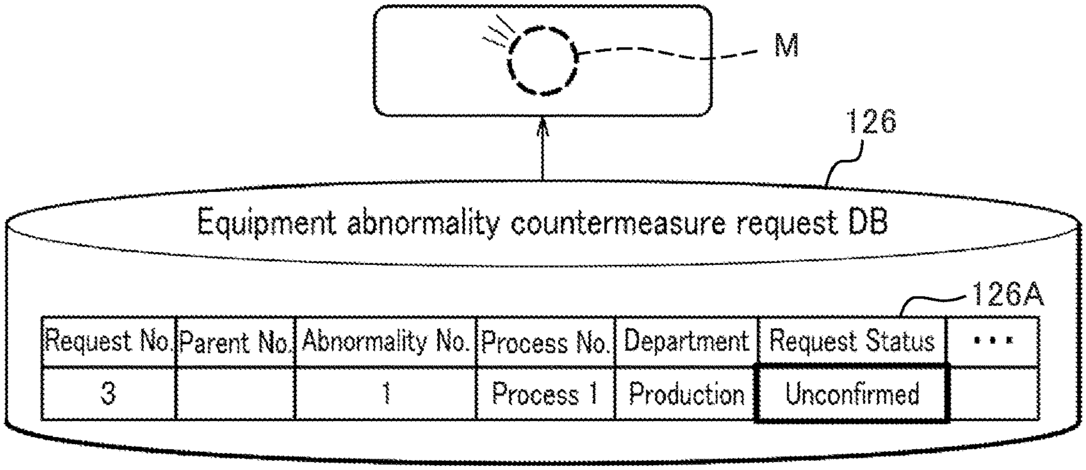
FIG. 29 is a diagram (2) illustrating an example of the abnormality occurrence alarm display.

FIG. 29 illustrates the equipment abnormality countermeasure request DB 126 when information is stored in the equipment abnormality countermeasure request information 126A, as illustrated in FIG. 17. In FIG. 29, "Unconfirmed"

is registered in a column of "Request Status" of the equipment abnormality countermeasure request information 126A, similarly to FIG. 17. In this case, as illustrated in FIG. 29, the output processing part 211 makes the display board 221 display the alarm information M of a blinking red circle (in FIG. 29, represented as a bold solid circle with three lines upper left thereof) indicating that an abnormality has occurred and a countermeasure has not yet been taken. Such a display of the alarm information M described above is herein referred to as "Abnormality display (large)".

Figure 30:
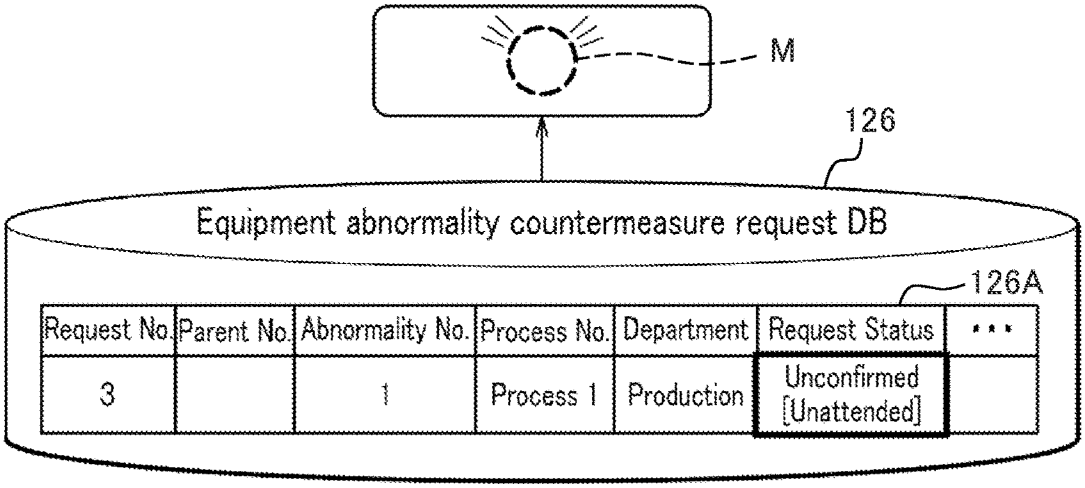
FIG. 30 is a diagram (3) illustrating an example of the abnormality occurrence alarm display.

FIG. 30 illustrates the equipment abnormality countermeasure request DB 126 when "Request Status" of the equipment abnormality countermeasure request information 126A is "Unconfirmed", and, at the same time, a current time is beyond a time registered in the column of "Date and Time of Occurrence" as illustrated in FIG. 25. In FIG. 30, "Unconfirmed [unattended]" is registered in a column of "Request Status" of the equipment abnormality countermeasure request information 126A, similarly to FIG. 25. In this case, as illustrated in FIG. 30, the output processing part 211 makes the display board 221 display a high-frequency blinking red circle (In FIG. 30, represented as a bold broken circle with three lines upper left and right thereof) indicating that the current time is beyond the time registered in the column of "Date and Time of Occurrence" without any countermeasure for the abnormality in the equipment being taken. Such a display of the alarm information M described above is herein referred to as "Abnormality display (very large)".

Note that as illustrated in FIG. 27, though a countermeasure has been taken in response to the abnormality in the equipment, when the countermeasure has not been completed even after a scheduled date and time for the countermeasure has already passed, then FIG. 30 is displayed.

Figure 31:
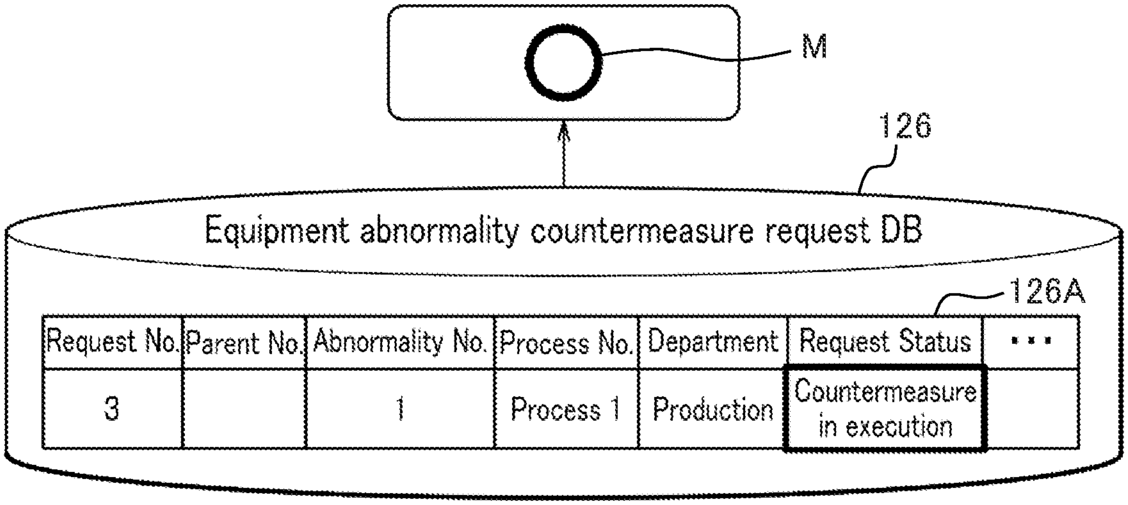
FIG. 31 is a diagram (4) illustrating an example of the abnormality occurrence alarm display.

FIG. 31 is a diagram illustrating the equipment abnormality countermeasure request DB 126 when a countermeasure for the abnormality in the equipment is being executed (a current time is not past a scheduled time for the countermeasure), as illustrated in FIG. 22. In FIG. 31, "Countermeasure in execution" is registered in a column of "Request Status" of the equipment abnormality countermeasure request information 126A, similarly to FIG. 22. In this case, as illustrated in FIG. 31, the output processing part 211 makes the display board 221 display the alarm information M of a red circle (in FIG. 31, represented as a bold solid circle) indicating that an abnormality has occurred. Such a display of the alarm information M described above is herein referred to as "Abnormality display (small)".

Figure 32:
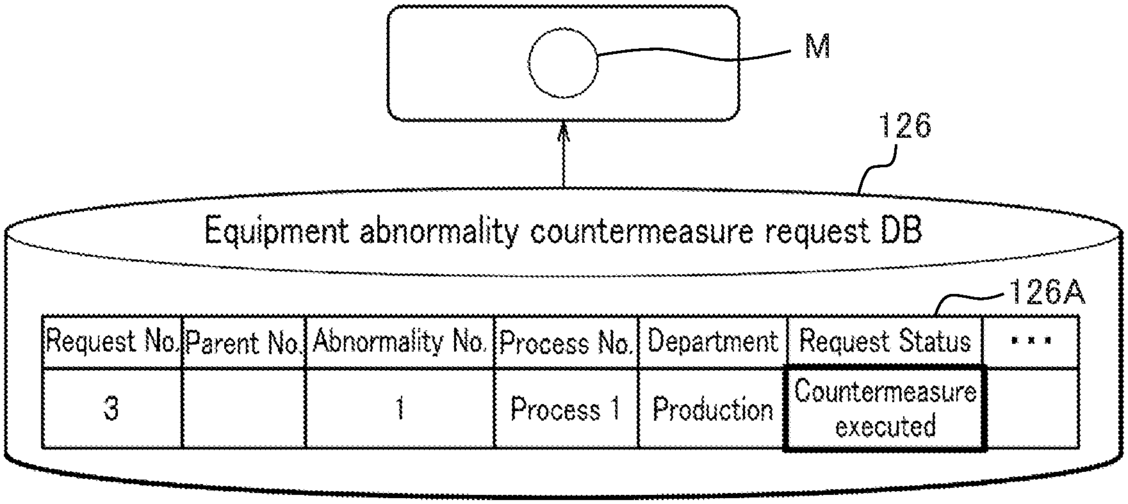
FIG. 32 is a diagram (5) illustrating an example of the abnormality occurrence alarm display.

FIG. 32 illustrates the equipment abnormality countermeasure request information 126A when the countermeasure for the abnormality in the equipment has completed, similarly to FIG. 23. In FIG. 32, "Countermeasure executed" is registered in a column of "Request Status" of the equipment abnormality countermeasure request information 126A, similarly to FIG. 23. In this case, as illustrated in FIG. 32, the output processing part 211 makes the display board 221 display the alarm information M represented by a green circle (in FIG. 32, represented as a thin solid circle) indicating that an abnormality has not occurred in an equipment. Such a display of the alarm information M described above is herein referred to as "Normality display".

A user can customize how the alarm information M is displayed.

As described above, whether or not a department of its own should take a countermeasure for an abnormality or a degree of an abnormality (unattended, a countermeasure being executed but not attended, or the like) is highlighted in color, blink, or the like. This makes it possible to let a user know a state of a countermeasure of interest and also to encourage the user to take a countermeasure (an action).

Note that the display board 221 herein displays the alarm information M. Instead, an alarm may be issued using noise from the speaker 222. In this case, a type or a length of noise may be differently designed depending on information stored in the column of "Abnormality status" of the equipment abnormality alarm information 125A.

When a countermeasure is cancelled, information of "Request Status" of the equipment abnormality countermeasure request information 126A is updated to "Cancel" and the alarm information M is thereby displayed as "Normality display".

(Display)

Figure 33:
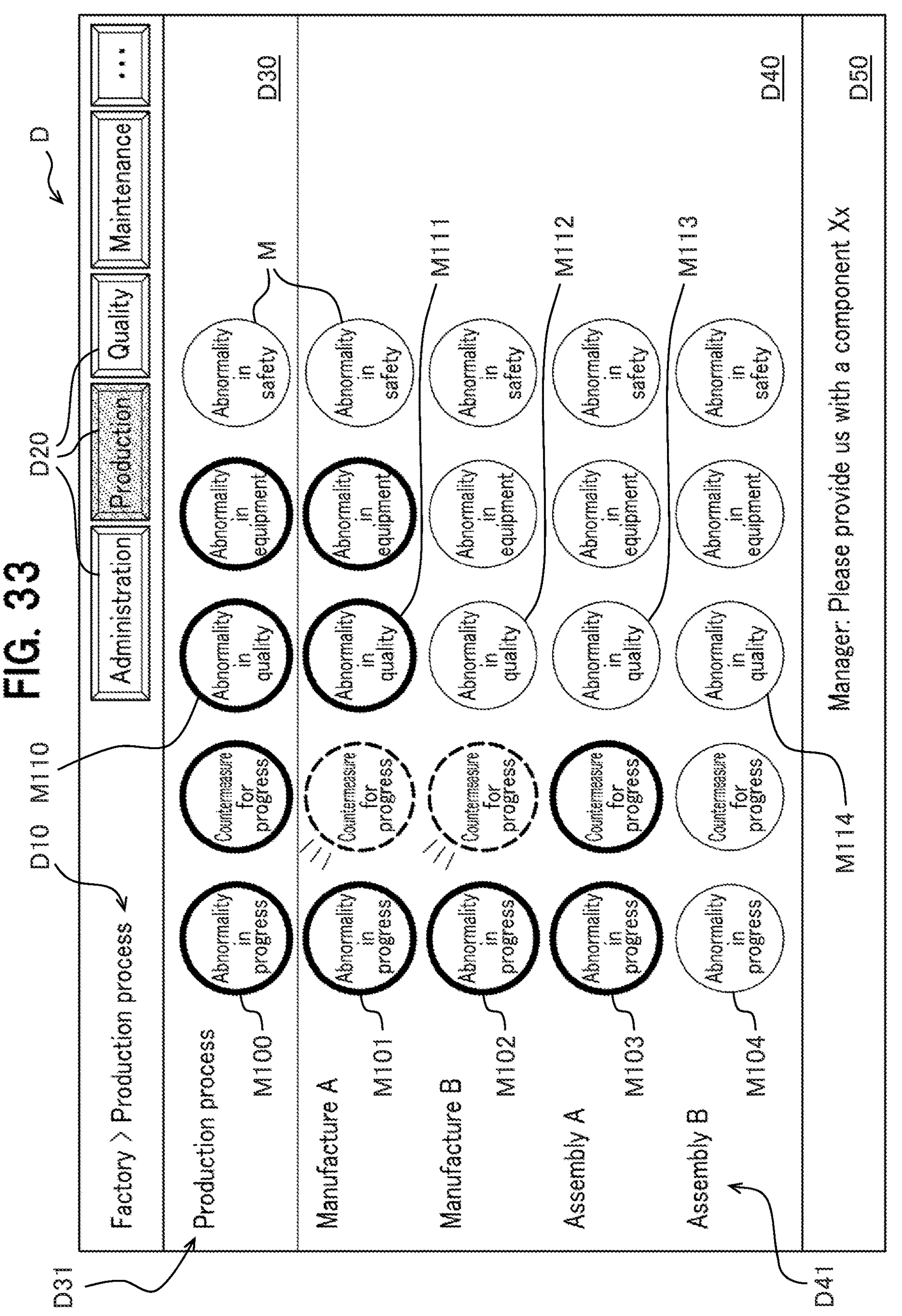
FIG. 33 is a diagram (1) illustrating an example of a state display screen.

FIG. 33 is a diagram illustrating an example of a state display screen D displayed in the display board 221.

A department display area D10, a work category button D20, an upper alarm display area D30, a lower alarm display area D40, and a manager calling display area D50 are provided on the state display screen D.

In FIG. 33, for example, "Factory>Production process" is selected in the department display area D10. "Production process" is one of subdepartments of "Factory". FIG. 33 illustrates a state of an equipment relevant to "Production process".

As illustrated in FIG. 33, "Administration", "Production", "Quality", "Maintenance", and the like are displayed each as the work category button D20. The work category used herein means a work position in a department. The work category button D20 is a button with which a user selects information that the user desires to display. For example, when a user works at "Production site" and wishes to see information on "Production", the user selects "Production" of the work category button D20 as illustrated in FIG. 33. Similarly, when the user wishes to see information on "Quality control", the user selects "Quality" of the work category button D20. When the user wishes to see information on "Maintenance management", the user selects "Maintenance" of the work category button D20. "Administration" of the work category button D20 may be selected by a user (a factory manager or the like) who wishes to know a general situation of "Factory" displayed in the department display area D10. The configuration described above allows the displayed alarm information M to be switched in accordance with a site at which the display board 221 is disposed or a work category of a user who wishes to look at information. This makes it possible for a user to display the alarm information M suited for the user's need.

The upper alarm display area D30 and the lower alarm display area D40 each display the alarm information M corresponding to the work category button D20. That is, the upper alarm display area D30 and the lower alarm display area D40 each display the alarm information M which a user who has selected the work category button D20 wishes to see. As described above, the state display screen D has the upper alarm display area D30 and the lower alarm display area D40 separately from each other. This makes it possible to easily obtain an overview of the alarm information M in an upper-layer department and a lower-layer department, thus allowing conditions of an abnormality or a countermeasure to be determined from a broad view.

In the example of FIG. 33, "Production" of the work category button D20 has been selected. The upper alarm display area D30 and the lower alarm display area D40 thus each display the alarm information M which a user in a department of "Production process" illustrated in the department display area D10 wishes to look at. The alarm information M is displayed in accordance with the processings illustrated in FIG. 2 to FIG. 32. How the alarm information M is displayed is represented consistent with FIG. 12 to FIG. 16 and FIG. 28 to FIG. 32.

The upper alarm display area D30 displays the alarm information M on a department specified in the department display area D10. The lower alarm display area D40 displays the alarm information M on a subdepartment of the department displayed in the upper alarm display area D30. In the example of FIG. 33, the upper alarm display area D30 displays the alarm information M on the entire "Production process". The lower alarm display area D40 displays the alarm information M on each of processes in "Production process", namely, "Manufacture A", "Manufacture B", "Assembly A", and "Assembly B". An upper department display area D31 of the upper alarm display area D30 displays "Production process" which is a target to be displayed in the upper alarm display area D30. A lower department display area D41 of the lower alarm display area D40 displays "Manufacture A", "Manufacture B", "Assembly A", and "Assembly B", each of which is a target to be displayed in the lower alarm display area D40

When the alarm information M displays "Abnormality in ●●", the display of the alarm information M is made based on registrations in the abnormality registration processings (FIG. 2 to FIG. 16). For example, the alarm information M with "Abnormality in progress" displayed therein is displayed based on registration information in the progress abnormality alarm DB 121. The alarm information M with "Abnormality in equipment" displayed therein is displayed based on registration information in the equipment abnormality alarm DB 125. Similarly, the alarm information M with "Abnormality in quality" displayed therein is displayed based on registration information in the quality abnormality alarm DB 123. The alarm information M with "Abnormality in safety" displayed therein is displayed based on registration information in the safety abnormality alarm DB 124.

In the meanwhile, when the alarm information M displays "Countermeasure for ●●", the display of the alarm information M is made based on registrations in the countermeasure registration processings (FIG. 17 to FIG. 32). For example, the alarm information M with "Countermeasure for progress" displayed therein is displayed based on registration information in the progress abnormality countermeasure request DB 122. For example, in FIG. 33, "Countermeasure for progress" of "Manufacture A" is "Abnormality display (large)", showing that a delay in progress occurs in "Manufacture A" and a countermeasure is in a state of "Unconfirmed" (see FIG. 29).

The alarm information M in the same vertical row is the alarm information M of the same type. For example, alarm information M101 shows a progress in a process of "Manufacture A"; alarm information M102, of "Manufacture B"; alarm information M103, of "Assembly A"; and, alarm information M104, of "Assembly B".

Each of "Abnormality in progress", "Abnormality in quality", and the like, displayed as the alarm information M is herein referred to as an operation.

Note that which operation ("Abnormality in progress", "Abnormality in quality", or the like) of the alarm information M is displayed in each of "Manufacture A", "Manufacture B", "Assembly A", and "Assembly B" is determined by referencing, by the output processing part 211, the alarm information selection DB 127 to be described hereinafter. The above-described is similarly applied to the state display screen D described below.

The alarm information M100 shows a progress of "Production process" which is an upper department of each of "Manufacture A", "Manufacture B", "Assembly A", and "Assembly B". The same is applied to the other rows of the alarm information M.

When a plurality of different states (for example, in progress) are displayed in a plurality of lower departments, as illustrated in FIG. 33, the alarm information M as an upper department takes information of a state which draws the highest attention in the lower departments. For example, in the example of FIG. 33, "Normality display" is displayed as alarm information M112 to M114, each of which shows "Abnormality in quality" of "Manufacture B", "Assembly A", and "Assembly B", respectively. Meanwhile, "Abnormality display (small)" is displayed as alarm information M111 which shows "Abnormality in quality" of "Manufacture A". Alarm information M110 which shows "Abnormality in quality" of "Production process" as the upper department of "Manufacture A", "Manufacture B", "Assembly A", and "Assembly B" thus displays the alarm information M of "Abnormality display (small)", pursuant to "Abnormality display (small)" of "Manufacture A" which draws the highest attention of "Manufacture A", "Manufacture B", "Assembly A" and "Assembly B".

In the case described above, the alarm information M112 to D114 which shows "Abnormality in quality" of "Manufacture B", "Assembly A", and "Assembly B", respectively, displays "Normality display", and the alarm information M 111 which shows "Abnormality in quality" of "Manufacture A" displays "Abnormality display (small)". In quality abnormality alarm information (not illustrated) stored in the quality abnormality alarm DB 123, if a column of "Abnormality status" of "Production process" contains "Abnormality resolved", information of "Abnormality resolved" is given priority.

As described above, the output processing part 211: extracts information on a process to be displayed from the respective DBs 121 to 126 which store therein information of various types collected in a factory concerning a schedule, an achievement result, an abnormality, a countermeasure, or the like: and outputs the extracted information to the display board 221.

The output processing part 211 also displays a countermeasure priority order of an alarm, based on a condition set in a "priority order definition master".

Note that the state display screen D is refreshed on a regular basis. This makes it possible to display the up-to-date alarm information M.

The manager calling display area D50 displays the contents of the manager calling request information 130A illustrated in FIG. 20. The example of FIG. 33 displays information of "Manager: Please provide us with a component Xx" pursuant to the contents of the manager calling request information 130A illustrated in FIG. 20. The term "Manager" used herein is a manager of "Production process". Note that the state display screen D other than that of FIG. 33 displays no information in the manager calling display area D50.

Next is described a transition of the state display screen D.

Figure 34:
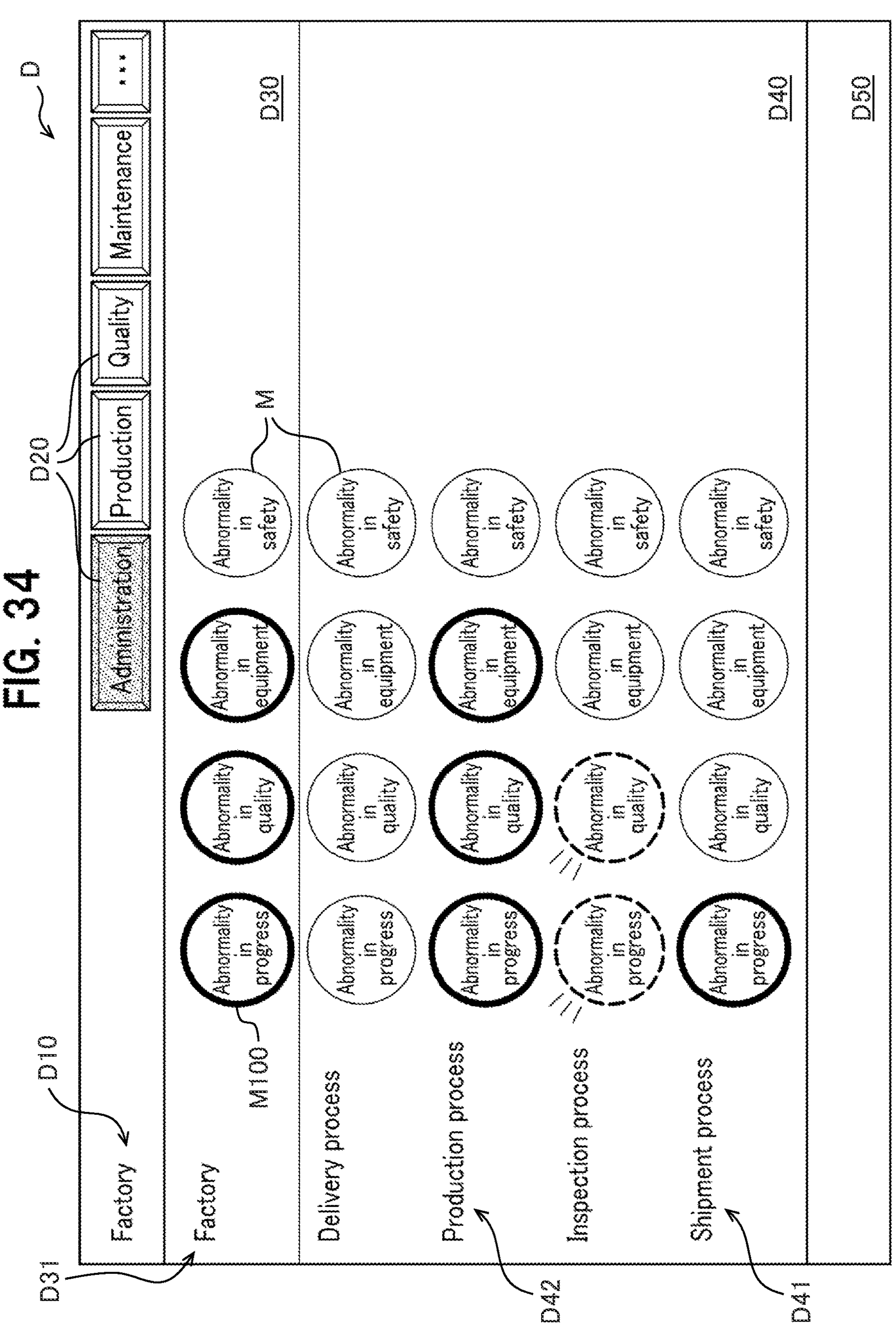
FIG. 34 is a diagram (2) illustrating an example of the state display screen.

FIG. 34 is a diagram illustrating an example in which, upon selection and input of "Factory" as a department to be displayed (see the department display area D10), the work category button D20 of "Administration" is displayed. In the example of FIG. 34, the upper alarm display area D30 thus displays the alarm information M on "Factory", and the lower alarm display area D40 displays "Delivery process", "Production process", "Inspection process", and "Shipment process", each as a lower department of "Factory".

Figure 35:
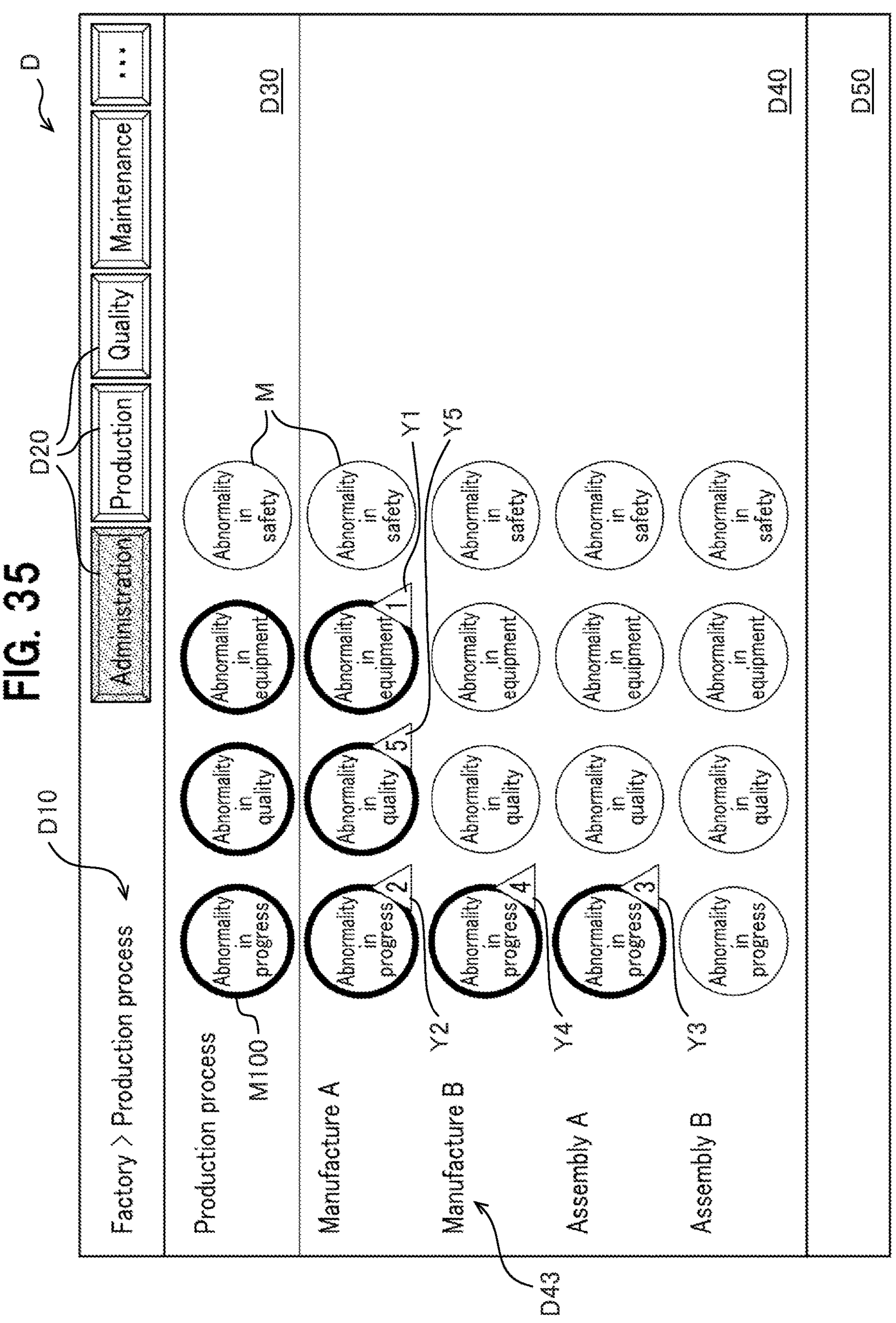
FIG. 35 is a diagram (3) illustrating an example of the state display screen.

When a user selects and inputs "Production process" displayed in the lower department display area D41 in the lower alarm display area D40, the output processing part 211 makes a screen of the display board 221 transit to the state display screen D illustrated in FIG. 35. Note that "Administration" of the work category button D20 remains unchanged. The state display screen D of FIG. 35 displays the alarm information M on "Production process" in a state where "Administration" of the work category button D20 has been selected and inputted. The upper department and the lower departments displayed in FIG. 35 are the same as those of FIG. 33, description of which is thus omitted herein. Note that for a transition of the state display screen D to an upper department (in the example of FIG. 35, "Factory"), a user selects and inputs a name of the upper department displayed in the department display area D10 (in the example of FIG. 35, "Factory").

Note that in the example of FIG. 35, priority order displays Y1 to Y5 are given to some part of the alarm information M. That is, "Abnormality in equipment" in the process of "Manufacture A" has a priority order of "1" (the priority order display Y1); "Abnormality in progress" in the process of "Manufacture A", "2" (the priority order display Y2); "Abnormality in progress" in the process of "Assembly A", "3" (the priority order display Y3); "Abnormality in progress" in the process of "Manufacture B", "4" (the priority order display Y4); and, "Abnormality in quality" in the process of "Manufacture A", "5" (the priority order display Y5). The priority order displays Y1 to Y5 described above can be or cannot be displayed by switching on and off. The on-off display of the priority order displays Y1 to Y5 is set by using a set screen or by clicking a right mouse button to display an appropriate menu.

The priority order displays Y1 to Y5 are displayed based on referencing, by the output processing part 211, of priority order definition master information 128A stored in the priority order definition master DB 128 as illustrated in FIG. 36. Note that in the example of FIG. 36, the top five priority order displays Y1 to Y5 are displayed. The number of the displays may be, however, any number such as, for example, the top three displays and the top ten displays.

FIG. 36 is a diagram illustrating an example of the priority order definition master information 128A in "Production process".

As illustrated in the example of FIG. 36, the priority order definition master information 128A in "Production process" stores therein priority orders for each of "Manufacture A", "Manufacture B", "Assembly A", and "Assembly B", which constitute "Production process", with respect to each of "Abnormality in progress", "Abnormality in quality", "Abnormality in equipment", and "Abnormality in safety", which are operations. It is assumed herein that the priority order definition master information 128A is created for each displayed department, such as "Factory" and "Production process". The priority order definition master information 128A having all priority orders from the top to the bottom in all departments may be created. Note that the display of the priority order displays Y1 to Y5 is assumed to be turned off in the state display screen D other than that of FIG. 36.

Note that the higher the urgency, the higher the priority order. When one has an urgency at a level same as that of another, the priority order is determined based on the priority order definition master information 128A. The terms "the higher the urgency, the higher the priority order" herein mean that an item of interest in the alarm information M displayed as "Abnormality display (very large)" has the highest priority order; and, as "Abnormality display (small)", a lower priority order.

Figure 37:
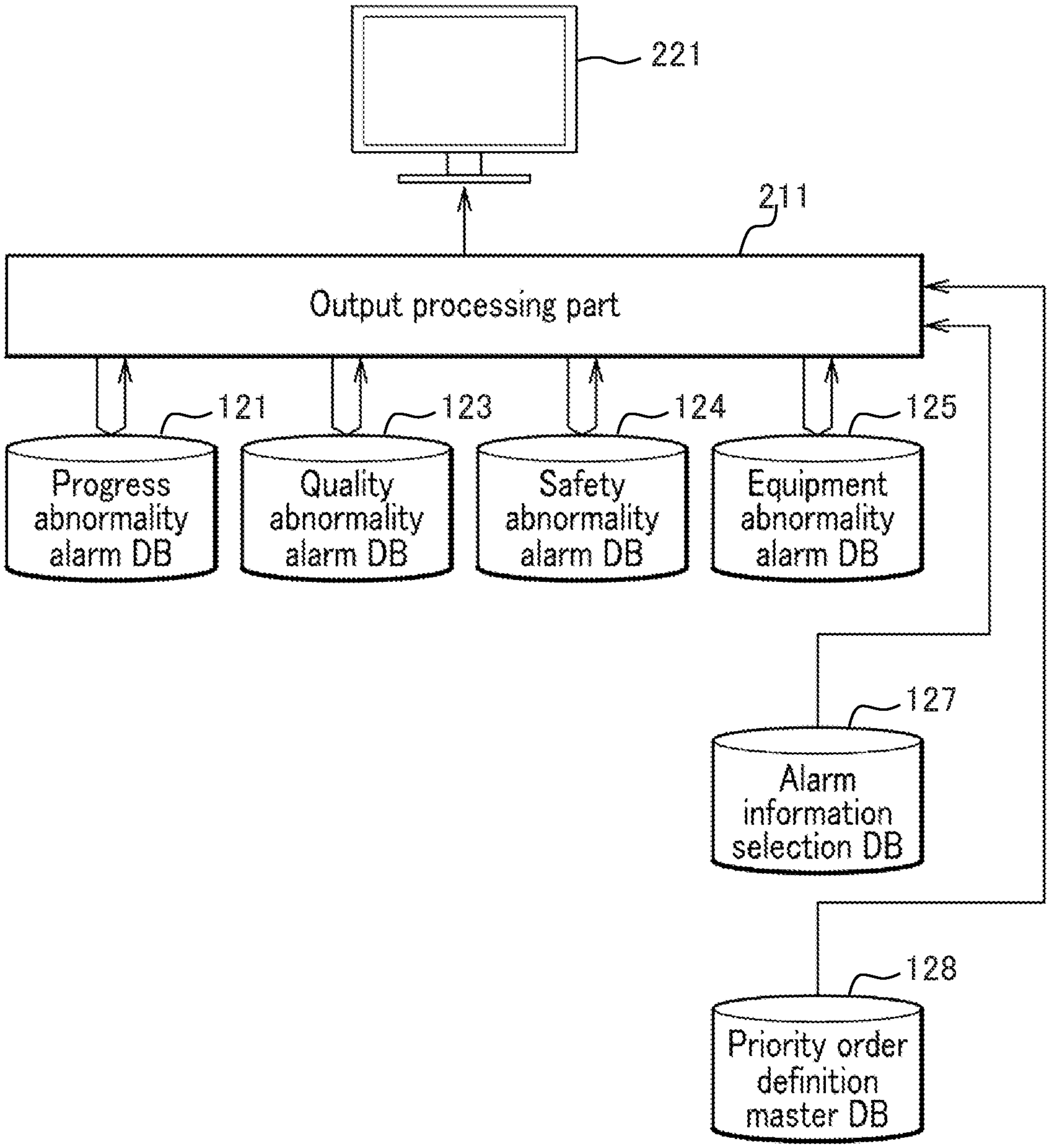
FIG. 37 is a diagram (1) illustrating how an output processing part operates when the state display screen is displayed.

FIG. 37 is a diagram illustrating how the output processing part 211 operates when the state display screen D of FIG. 35 is displayed.

As described above, the output processing part 211: references the alarm information selection DB 127; and thereby selects the DBs 121, 123 to 125 suited for a currently-selected department ("Production process": see the department display area D10) and the having-selected work category button D20 ("Administration"). The alarm information selection DB 127 will be described hereinafter. The progress abnormality alarm DB 121, the quality abnormality alarm DB 123, the safety abnormality alarm DB 124, and the equipment abnormality alarm DB 125 (corresponding to an operation of interest) are herein selected. The output processing part 211: references the selected DBs 121, 123 to 125; and thereby displays the appropriate alarm information M. In the example of FIG. 35, the display of the priority order displays Y1 to Y5 is set to be ON. Thus, the output processing part 211: also references the priority order definition master DB 128; and displays the priority order displays Y1 to Y5.

Figure 38:
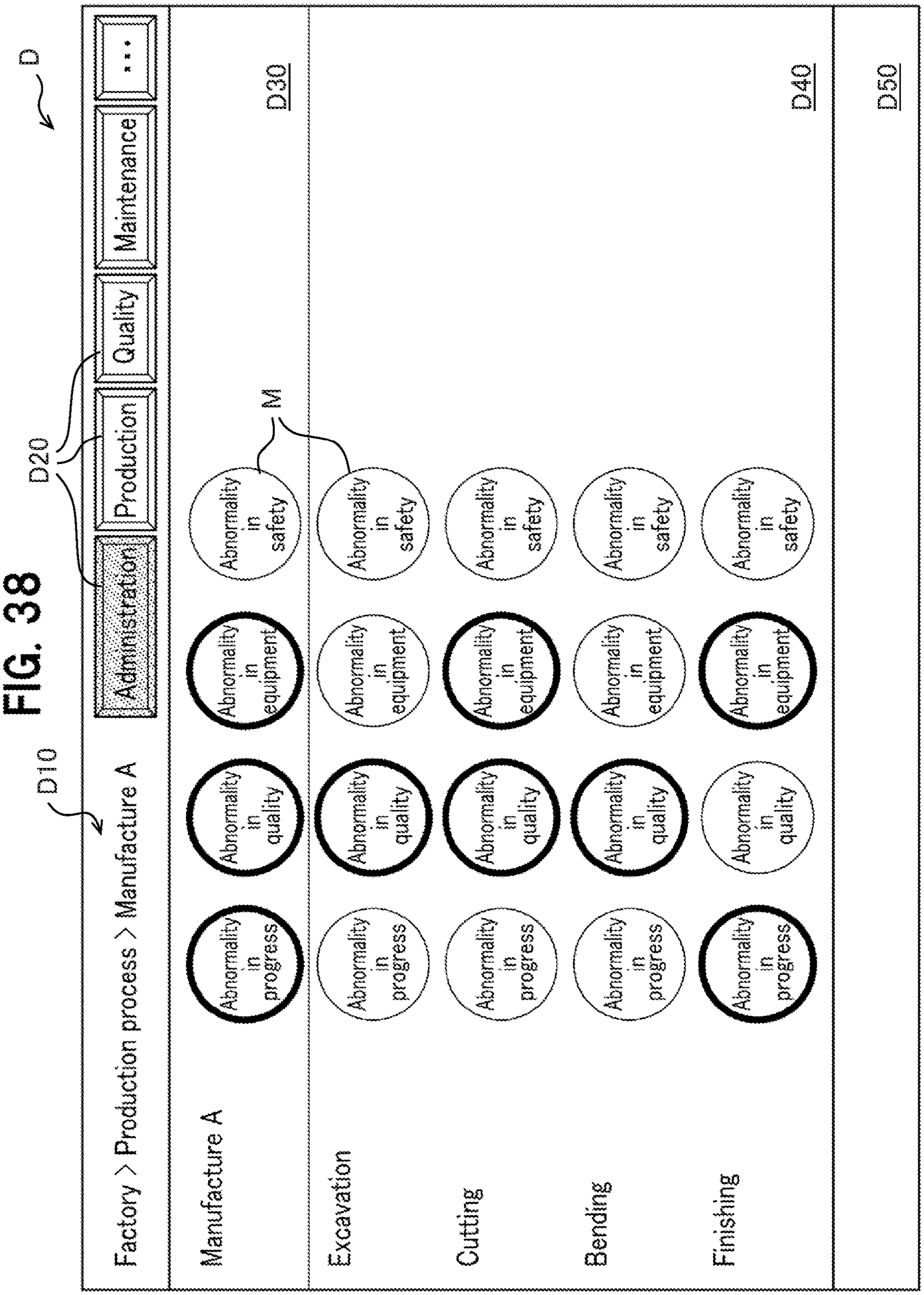
FIG. 38 is a diagram (4) illustrating an example of the state display screen.

When a user selects and inputs "Manufacture A" (reference numeral D43) displayed in the lower department display area D41 of the lower alarm display area D40 in FIG. 35, the output processing part 211 makes a screen of the display board 221 transit to the state display screen D of FIG. 38. Note that "Administration" of the work category button D20 continues to be selected. The state display screen D of FIG. 38 displays the alarm information M on "Manufacture A" in a state where "Administration" of the work category button D20 has been selected and inputted. The state display screen D of FIG. 38 has: the upper alarm display area D30 with the alarm information M on "Manufacture A" displayed therein; and the lower alarm display area D40 with the alarm information M on "Excavation", "Cutting", "Bending", and "Finishing", each of which is a subdepartment of "Manufacture A".

Figure 39:
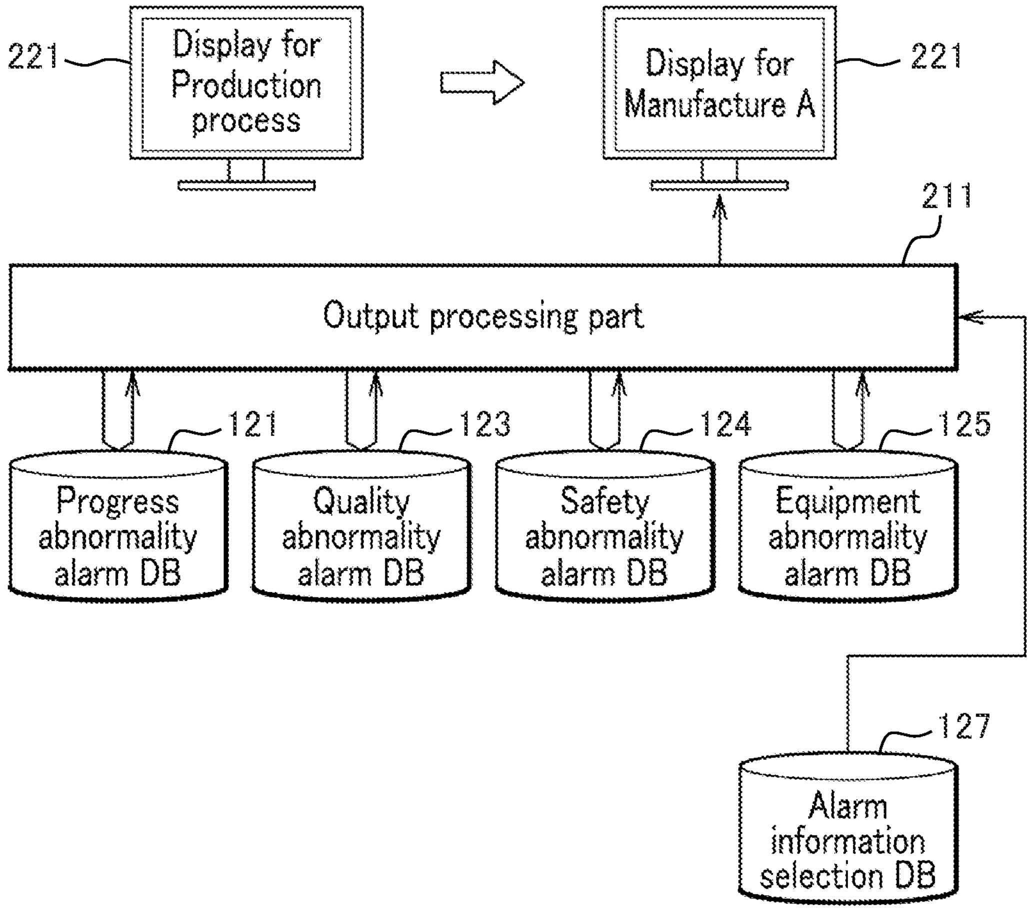
FIG. 39 is a diagram (2) illustrating how the output processing part operates when the state display screen is displayed.

FIG. 39 is a diagram illustrating how the output processing part 211 operates when the state display screen D of FIG. 35 is made to transit to the state display screen D of FIG. 38.

The output processing part 211: references the alarm information selection DB 127; and thereby selects the DBs 121, 123 to 125 suited for the selected department ("Manufacture A") and the having-selected work category button D20 ("Administration"). The alarm information selection DB 127 will be described hereinafter. The progress abnormality alarm DB 121, the quality abnormality alarm DB 123, the safety abnormality alarm DB 124, and the equipment abnormality alarm DB 125 (corresponding to an operation of interest) are herein selected. The output processing part 211: references the selected DBs 121, 123 to 125; and thereby displays the appropriate alarm information M on a production process (a production process display).

When the user selects and inputs "Manufacture A" (reference numeral D43) displayed in the lower department display area D41 of the lower alarm display area D40 of FIG. 35, the output processing part 211: references the alarm information selection DB 127; and selects the DBs 121, 123 to 125 suited for the selected department ("Manufacture A") and the having-been-selected work category button D20 ("Administration"). The alarm information selection DB 127 will be described hereinafter. The progress abnormality alarm DB 121, the quality abnormality alarm DB 123, the safety abnormality alarm DB 124, and the equipment abnormality alarm DB 125 (corresponding to an operation of interest) are herein selected. The output processing part 211: references the selected DBs 121, 123 to 125; and displays the alarm information M on Manufacture A (Manufacture A display).

Figure 40:
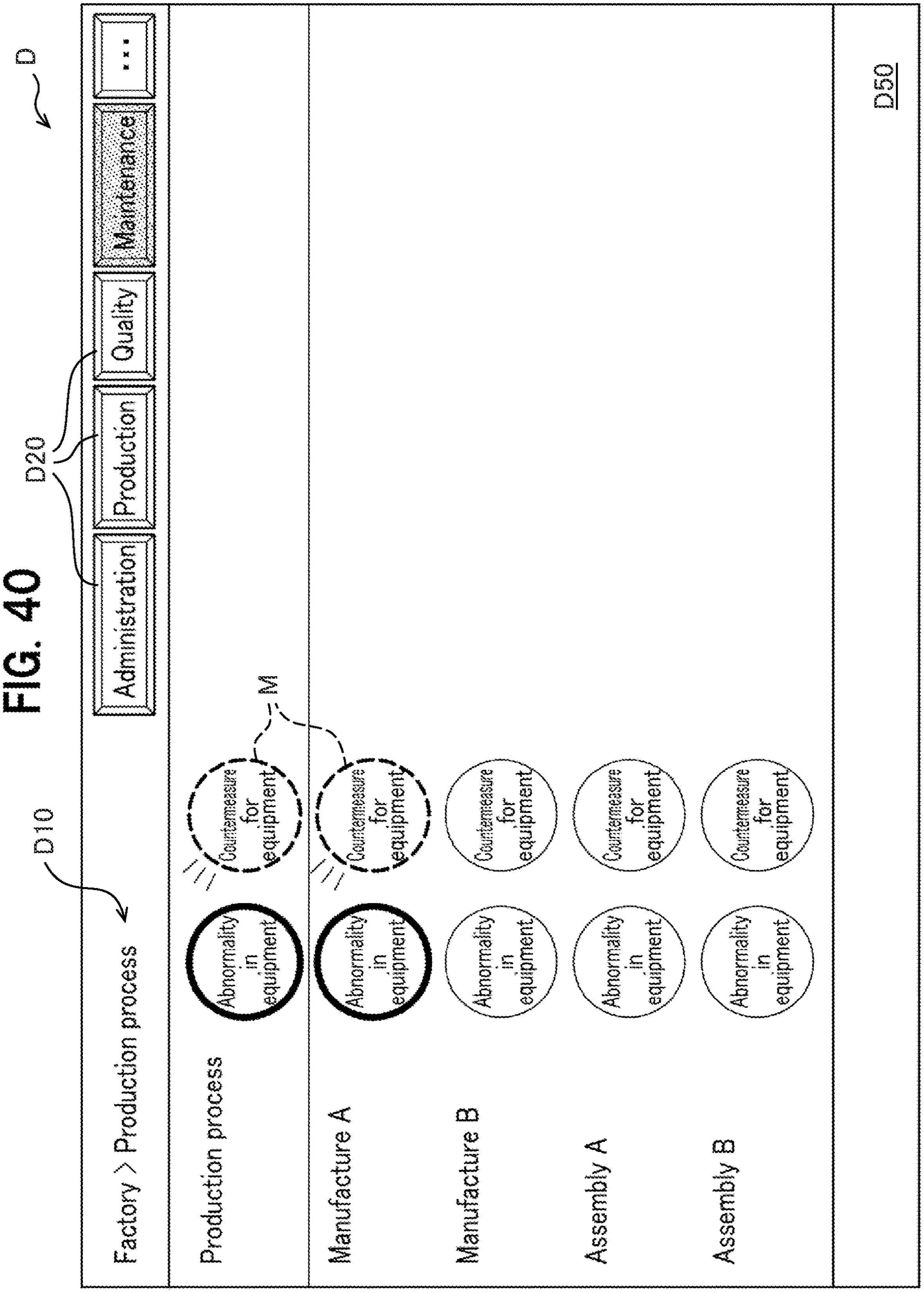
FIG. 40 is a diagram (5) illustrating an example of the state display screen.

When the user selects and inputs "Maintenance" of the work category button D20 on the state display screen D of FIG. 35, the output processing part 211 makes a screen of the display board 221 transit to the state display screen D of FIG. 40. Note that a department to be displayed herein is "Production process" which is the same as that of FIG. 35 (see the department display area D10). The state display screen D of FIG. 40 has, similarly to FIG. 35, the upper alarm display area D30 with the alarm information M on "Production process" and the lower alarm display area D40 with the alarm information M on "Manufacture A", "Manufacture B", "Assembly A", and "Assembly B", each of which is a process in "Production process". Note that, however, because "Maintenance" of the work category button D20 has been selected and inputted, the alarm information M on "Abnormality in equipment" and "Countermeasure for equipment" is displayed.

Figure 41:
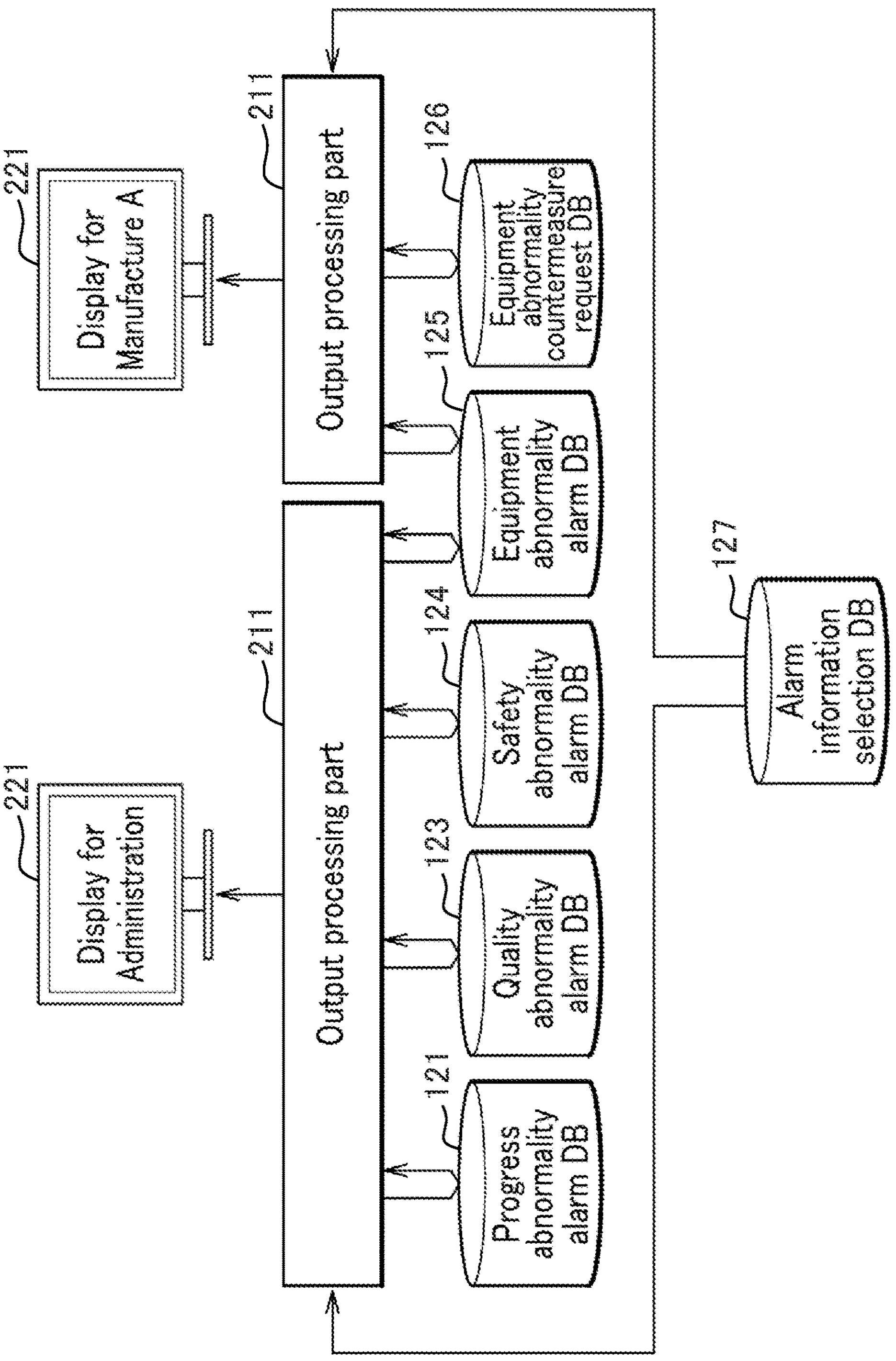
FIG. 41 is a diagram (3) illustrating how the output processing part operates when the state display screen is displayed.

FIG. 41 is a diagram illustrating how the output processing part 211 operates when the state display screen D of FIG. 35 is made to transit to the state display screen D of FIG. 40.

The output processing part 211 displays the alarm information M on the state display screen D (a display for Administration) of FIG. 35 displayed on the display board 221, based on the progress abnormality alarm DB 121, the quality abnormality alarm DB 123, the safety abnormality alarm DB 124, and the equipment abnormality alarm DB 125, which have been selected upon reference to the alarm information selection DB 127. When "Maintenance" of the work category button D20 in FIG. 35 is selected and inputted, the output processing part 211: references the alarm information selection DB 127; and selects the DBs 125, 126 suited for the having-been-selected work category button D20 ("Maintenance"). The alarm information selection DB 127 will be described hereinafter. The equipment abnormality alarm DB 125 and the equipment abnormality countermeasure request DB 126 (corresponding to an operation of interest) are herein selected. The output processing part 211: references the selected DBs; and thereby displays the state display screen D (a display for Maintenance) displayed in FIG. 40 on the display board 221.

(Alarm Information Selection Information 127A)

Figure 42:
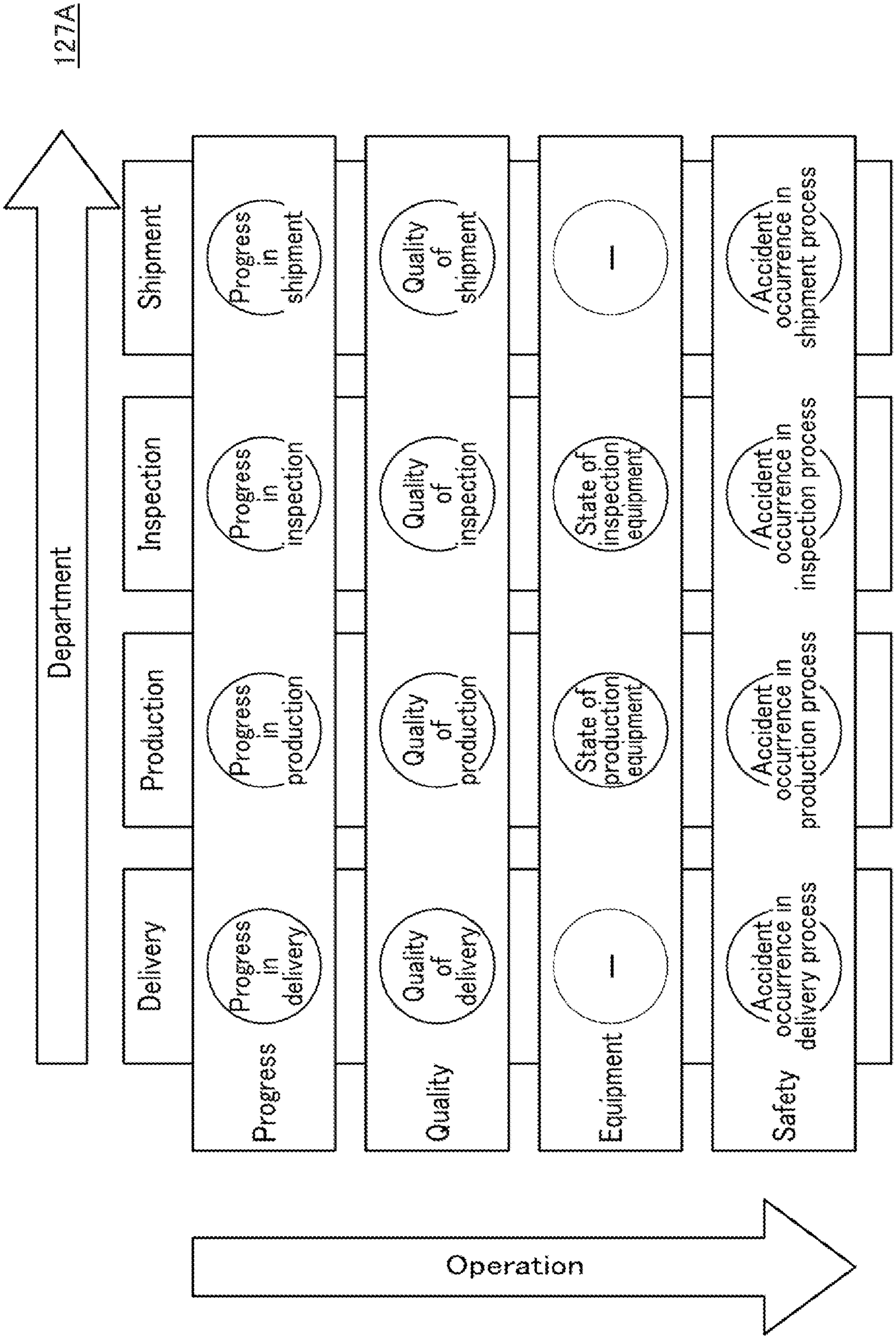
FIG. 42 is a diagram illustrating an example of alarm information selection information.

FIG. 42 is a diagram illustrating an example of the alarm information selection information 127A according to the embodiment.

The figure exemplifies the alarm information selection information 127A on an abnormality in "Factory". The terms "on an abnormality" herein mean that the alarm information M is relevant to "Abnormality" of various types such as "Abnormality in equipment" and "Abnormality in progress". Similarly, the alarm information selection information 127A on "Countermeasure" is provided such as "Countermeasure for abnormality in equipment" and "Countermeasure for abnormality in progress". Note that FIG. 42 illustrates the alarm information selection information 127A concerning "Factory", and the PDCA control system 1 includes the alarm information selection information 127A, similar to the described above, on other processes such as "Production process" and "Manufacture A". The PDCA control system 1 also has the similar alarm information selection information 127A for each of the respective operations.

The alarm information selection information 127A is stored in the alarm information selection DB 127. The output processing part 211: references a department displayed in the department display area D10 and the alarm information selection DB 127; and thereby selects the alarm information M to be displayed.

The alarm information selection information 127A in the example of FIG. 42 has a department on the abscissa and an operation on the ordinate. A circle represents information to be displayed as the alarm information M for each department; and, a sign "-" represents information not to be displayed.

For example, in a case of "Delivery process", in order to display each of "Progress in delivery", "Quality of delivery", and "Accident occurrence in delivery process" as the alarm information M, the operations "Progress", "Quality", and "Safety" are displayed as the alarm information M of "Abnormality in progress", "Abnormality in quality", and "Abnormality in safety", respectively. In other words, the output processing part 211: selects the progress abnormality alarm DB 121, the quality abnormality alarm DB 123, and the safety abnormality alarm DB 124; and displays appropriate information therein as the alarm information M. Similarly, in a case of "Production process", in order to display each of "Progress in production", "Quality of production", "State of production equipment", and "Accident occurrence in production process" as the alarm information M, the operations "Progress", "Quality", "Equipment", and "Safety" are displayed as the alarm information M of "Abnormality in progress", "Abnormality in quality", "Abnormality in equipment", and "Abnormality in safety", respectively (see FIG. 33 and FIG. 35). Note that, also in a case of a state of countermeasure such as "Countermeasure for progress", information on which of the alarm information M with respect to a department and an operation is displayed is stored in the alarm information selection DB 127 as the alarm information selection information 127A. In the case of the state of countermeasure such as "Countermeasure for progress", as described later in FIG. 44A to FIG. 47C, "Department" of the progress abnormality countermeasure request DB 122 or the equipment abnormality countermeasure request DB 126 is also referenced.

FIG. 42 illustrates a relationship between a department (displayed in the department display area D10, the upper department display area D31, or the lower department display area D41) and the alarm information M to be displayed. The alarm information selection information 127A stored in the alarm information selection DB 127 also includes information having a configuration similar to the described above with a relationship between the work category button D20 and the alarm information M to be displayed. The alarm information selection DB 127 may also store therein information on an equipment to be displayed as the alarm information M.

Figure 43:
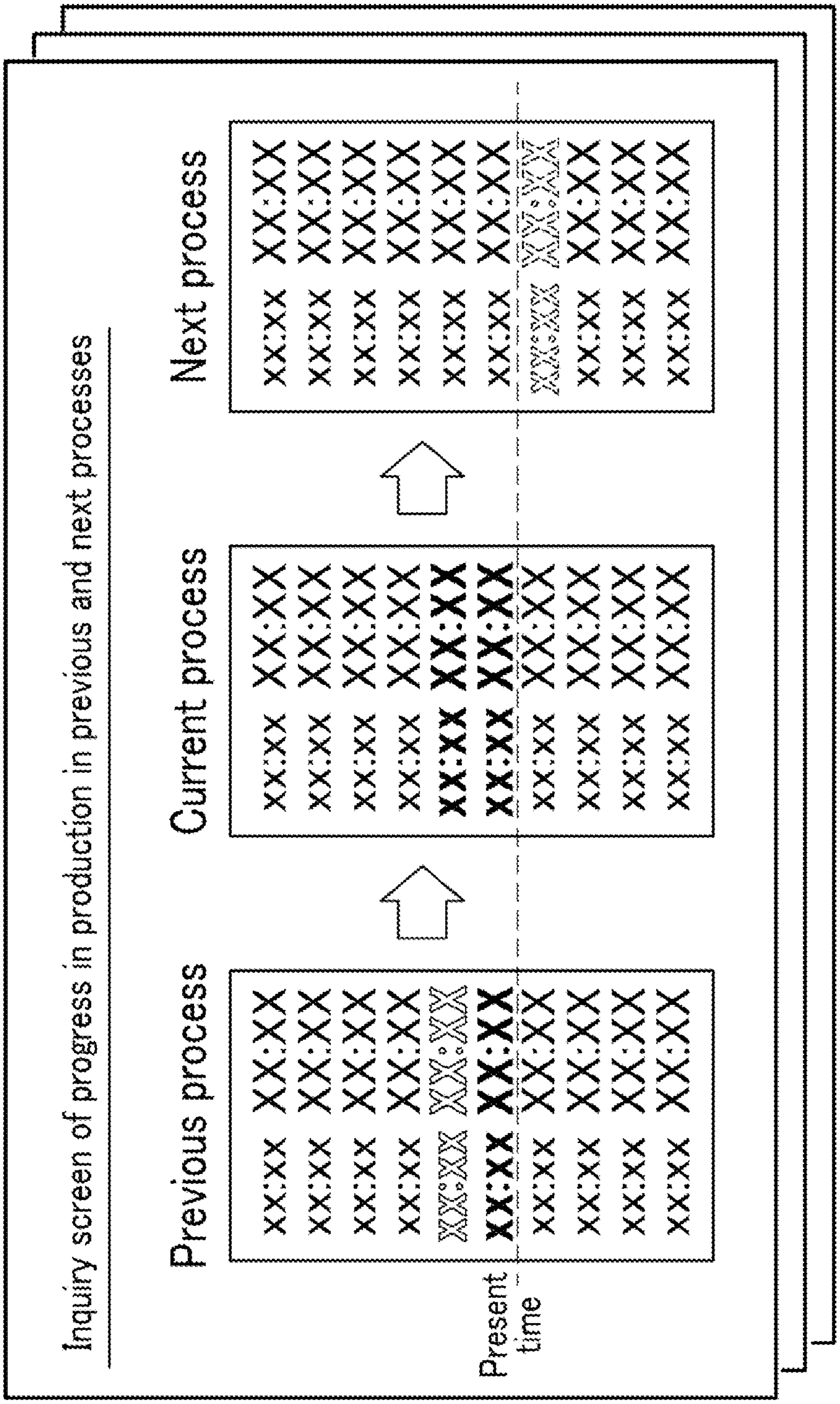
FIG. 43 is a diagram illustrating an example of a detailed information screen.

FIG. 43 is a diagram illustrating an example of a screen of detailed information. The detailed information screen as illustrated in FIG. 43 is a screen displayed on, for example, another window in response to a selection and an input of the alarm information M displayed in the upper alarm display area D30 or the lower alarm display area D40.

The example of FIG. 43 is a screen displayed in response to a selection and an input of the alarm information M102 in the upper alarm display area D30 or the lower alarm display area D40 illustrated in FIG. 33. The alarm information M102 is the alarm information M on "Abnormality in progress" and a detailed information screen thereof displays information on a progress. In the example of FIG. 43, a bold character represents that a delay has occurred; a solid open character represents that a large delay has occurred (Large delay); and, a broken open character represents that a progress goes in advance. The terms "goes in advance" herein mean that a progress gets ahead of schedule. A broken line represents a current time. The example of FIG. 43 allows a user to recognize that a progress of "Manufacture B" illustrated in FIG. 33 is delayed not only in a current process but also in the previous process.

(Switching of Alarm Information M Upon Request for Countermeasure to Other Department)

Next is described switching of the alarm information M upon a request for countermeasure to other department with reference to FIG. 44A to FIG. 47C.

Each of FIG. 44A, FIG. 45A, FIG. 46A, and FIG. 47A illustrates the equipment abnormality countermeasure request information 126A. Note that each of FIG. 44A, FIG. 45A, FIG. 46A, and FIG. 47A illustrates items of only "Department" and "Request Status" of the equipment abnormality countermeasure request information 126A. Each of FIG. 44B, FIG. 45B, FIG. 46B, and FIG. 47B illustrates the alarm information M in a department of a production process. Each of FIG. 44C, FIG. 45C, FIG. 46C, and FIG. 47C illustrates the alarm information M in a department of maintenance management. Note that the alarm information M in the department of maintenance management is a state in which the alarm information M is displayed on the state display screen D on which the "Production" of the work category button D20 has been selected and inputted (corresponding to FIG. 33). The alarm information M in the maintenance management is a state in which the alarm information M is displayed on the state display screen D on which "Maintenance" of the work category button D20 has been selected and inputted (corresponding to FIG. 40). In each of FIG. 44B, FIG. 44C, FIG. 45B, FIG. 45C, FIG. 46B, FIG. 46C, FIG. 47B, and FIG. 47C, only the alarm information M on "Abnormality in equipment" and "Countermeasure for equipment" is illustrated. In FIG. 33, the state display screen D of the department of the production process does not display the alarm information M on "Countermeasure for equipment". For the sake of explanation, it is assumed herein that the alarm information M on "Countermeasure for equipment" is displayed on the state display screen D of the department of the production process.

In each of FIG. 44B, FIG. 45B, FIG. 46B, and FIG. 47B, the output processing part 211: references the equipment abnormality alarm information 125A on the department of "Production"; and thereby displays the alarm information M on "Abnormality in equipment". In each of FIG. 44C, FIG. 45C, FIG. 46C, and FIG. 47C, the output processing part 211: references the equipment abnormality alarm information 125A on the department of "Maintenance"; and thereby displays the alarm information M on "Abnormality in equipment".

Similarly, in each of FIG. 44B, FIG. 45B, FIG. 46B, and FIG. 47B, the output processing part 211 references the equipment abnormality countermeasure request information 126A on the department of "Production"; and thereby displays the alarm information M on "Countermeasure for equipment". In each of FIG. 44C, FIG. 45C, FIG. 46C, and FIG. 47C, the output processing part 211 references the equipment abnormality countermeasure request information 126A on the department of "Maintenance"; and thereby displays the alarm information M on "Countermeasure for equipment".

Note that, for example, in the alarm information selection information 127A (FIG. 42), even when "Countermeasure for equipment" in the department of "Maintenance" is not set to be displayed, if items of "Department" in the equipment abnormality countermeasure request information 126A include "Maintenance", that is, the department of "Maintenance" receives a countermeasure from another department, the output processing part 211 displays appropriate contents in the equipment abnormality countermeasure request DB 126 as the alarm information M.

FIG. 44A to FIG. 44C each illustrate a state in which an abnormality has occurred and the department of the production process has started a countermeasure. As illustrated in FIG. 44A, "Production" is registered in a column of "Department" of the equipment abnormality countermeasure request information 126A; and, "Countermeasure in execution", in a column of "Request Status" (corresponding to FIG. 22). At this time, in the department of the production process, as illustrated in FIG. 44B, each of "Abnormality in equipment" and "Countermeasure for equipment" is displayed as "Abnormality display (small)". Because a countermeasure is not yet requested to the department of the maintenance management, as illustrated in FIG. 44C, in the department of the maintenance management, though "Abnormality in equipment" is displayed as "Abnormality display (small)", "Countermeasure for equipment" is displayed as "Normality display".

FIG. 45A to FIG. 45C each illustrate a state in which the department of the production process cannot take an appropriate countermeasure and makes a request for the countermeasure to the department of the maintenance management. As illustrated in FIG. 45A, "Request made" is registered in "Request Status" in a record of "Production" of the equipment abnormality countermeasure request information 126A; and, "Unconfirmed", in "Request Status" in a record of "Maintenance" (corresponding to FIG. 19). At this time, in the department of the production process, as illustrated in FIG. 45B, though "Abnormality in equipment" is displayed as "Abnormality display (small)", because a request for the countermeasure is made to the department of the maintenance management, "Countermeasure for equipment" is displayed as "Normality display". Then, the department of the maintenance management has been requested for the countermeasure and is in a state of "Unconfirmed". Therefore, as illustrated in FIG. 45C, in the department of the maintenance management, "Abnormality in equipment" is displayed as "Abnormality display (small)", and "Request Status" of "Countermeasure for equipment" is displayed as "Abnormality display (large)" (see FIG. 29).

FIG. 46A to FIG. 46C each illustrate a state in which the department of the maintenance management having received the request for a countermeasure has started the countermeasure for an abnormality in an equipment. As illustrated in FIG. 46A, "Request made" is registered "Request Status" in a record of "Production" in the equipment abnormality countermeasure request information 126A; and, "Countermeasure in execution", in "Request Status" in a record of "Maintenance" (corresponding to time period FIG. 22). At this time, in the department of the production process, as illustrated in FIG. 46B, "Abnormality in equipment" is displayed as "Abnormality display (small)", and, because the request for the countermeasure has been made to the department of the maintenance management, "Countermeasure for equipment" is displayed as "Normality display". In the department of the maintenance management, because of "Countermeasure in execution", as illustrated in FIG. 46C, each of "Abnormality in equipment" and "Countermeasure for equipment" is displayed as "Abnormality display (small)" (corresponding to FIG. 31).

FIG. 47A to FIG. 47C each illustrate in a state in which the department of the maintenance management having received the request for the countermeasure has completed the countermeasure for the abnormality in the equipment. As illustrated in FIG. 47A, "Countermeasure executed" is registered in "Request Status" in a record of each of "Production" and "Maintenance" of the equipment abnormality countermeasure request information 126A (see FIG. 23). At this time, in the department of the production process, as illustrated in FIG. 47B, each of "Abnormality in equipment" and "Countermeasure for equipment" is displayed as "Normality display". As illustrated in FIG. 47C, also in the department of the maintenance management, each of "Abnormality in equipment" and "Countermeasure for equipment" is displayed as "Normality display" (see FIG. 32).

In this embodiment, a range of information displayed is switched depending on a user to view the information. The display is switched on a basis of a hierarchical structure of departments. This makes it possible to display appropriate information for a user and to improve efficiency of the PDCA.

In sum, the present embodiment have features and advantageous effects as follows.

(C1) To visually display whether or not an abnormality has occurred, and, if any, where the abnormality has occurred The display is made as described above in a visually recognizable manner in which, for example, whether or not an abnormality has occurred is differently displayed in color, blink, or the like, for each department. This makes it possible to efficiently let a user or the like to know an abnormality.

(C2) To visually display a state of a countermeasure for an abnormality

The display of a state of a countermeasure for an abnormality is made as described above in a visually recognizable manner. Even when a countermeasure does not go well, the display in the visually recognizable manner allows to attract a user's attention and encourages the user to take an appropriate countermeasure. A plan of the countermeasure is displayed based on a past case stored in the countermeasure master DB 129, to thereby assist the countermeasure to be taken. This makes it possible to easily recognize an occurrence of an abnormality and to provide a mechanism to follow up a countermeasure for the abnormality, which results in a prompt response thereto.

(C3) To display an overall condition of all departments of a factory concurrently on a real-time basis The display of information on all of production, quality, maintenance, safety, or the like in an entire factory is made on a single screen as described above. This makes it possible to recognize an overall condition of the factory across its operations.

The display of an alarm priority order of abnormalities to be dealt with in a secondary manner, as illustrated in FIG. 35, makes it possible to facilitate an easier determination on which abnormality or countermeasure a user should handle.

(C4) To switch displays in accordance with sites or viewers

Different screens are displayed depending on viewers in different positions (a factory manager, a person in charge of production, quality, maintenance, or the like). Display ranges are also switched accordingly (an entire factory, for each process, or the like). This makes it possible for a user to promptly get information the user wants to view, even when different users wish to see different ranges or contents of information depending on work categories or work positions.

When a department at which abnormality has occurred cannot take a countermeasure by itself, the department passes information on the countermeasure to another department. This makes it possible to facilitate cooperation between the departments and to improve operation efficiency.

The present invention is carried out not only by the above-described embodiment but also by variations of many types. For example, the above-described embodiment is intended to be illustrative of the present invention in an easily understandable manner and the present invention is not limited to the one including all of the components explained in the embodiment.

In this embodiment, a countermeasure to an abnormality in quality or safety is not described. The steps illustrated in FIG. 17 to FIG. 32 may also be, however, performed to the countermeasure to an abnormality in quality or safety. In this embodiment, the output processing part 211 of the terminal device 200 selects any appropriate DB of the DBs 121 to 126. Instead, the operation control apparatus 100 may make the selection.

A part or all of configurations, functions, respective parts 111 to 113, respective DBs 121 to 130, or the like can be realized by hardware by means of, for example, designing of integrated circuits. As illustrated in FIG. 1 the above-described configurations, functions, or the like can be embodied by software in which, for example, a processor such as the CPUs 101, 201 interprets and executes a program which realizes the functions. Data in a program, a table, a file, and the like for realizing such functions can be stored in a storage device including the memories 110, 210 and a SSD (Solid State Drive) or in a storage medium including an IC card, a SD card, and a DVD (Digital Versatile Disc). At least one of the DBs 121 to 130 may be provided outside the operation control apparatus 100, such as a cloud.

In the embodiments, only a control line or an information line which is deemed necessary for explanation is illustrated, and not all of them which are necessary for a product are illustrated. In practice, almost all elements are deemed to be connected to each other.

DESCRIPTION OF REFERENCE NUMERALS

1 PDCA control system (operation control system)
100 operation control apparatus
111 registration processing part (storing processing part)
112 equipment abnormality monitor part
113 countermeasure monitor part (countermeasure monitor part)
121 progress abnormality alarm DB (abnormality information storage part)
121A progress abnormality alarm information (abnormality information)
122 progress abnormality countermeasure request DB (countermeasure progress information storage part)
123 quality abnormality alarm DB (abnormality information storage part)
124 safety abnormality alarm DB (abnormality information storage part)
125 equipment abnormality alarm DB (abnormality information storage part)
125A equipment abnormality alarm information (abnormality information)

126 equipment abnormality countermeasure request DB (countermeasure progress information storage part)
126A equipment abnormality countermeasure request information (countermeasure information)
127 alarm information selection DB (information selection storage part)
128 priority order definition master DB
203 input device (input part)
211 output processing part
220 output device (output part)
221 display board (display part)
230 progress monitor device (abnormality monitor part)
D state display screen (screen)
D30 upper alarm display area (first screen)
D40 lower alarm display area (second screen)
M alarm information

The invention claimed is:

1. An operation control system, comprising:
at least one memory storing at least one program; and
at least one processor which when executing the at least one program configures the at least one processor to:
collect information on an abnormality in a plurality of departments of a factory, a plurality of the departments having a hierarchical relationship therebetween, and store the collected information on the abnormality in at least one database in which abnormality information including information on a state of the abnormality is stored, or in which countermeasure information including information on a state of a countermeasure for the abnormality is stored;
receive information on one of the departments requested by a user and information on a work category of the user, the work category being a position of the user in the department;
store selection information which is information on, in the department and the work category, which one of the abnormality information stored in the abnormality information storage part and the countermeasure information stored in the countermeasure information is to be selected; monitor a length of a time period during which the abnormality continues, and, when the length of the time period exceeds a prescribed time period, update the state of the abnormality in the abnormality information;
monitor the state of the countermeasure, and, when the state of the countermeasure changes, update the state of the countermeasure of the countermeasure information;
select the abnormality information and the countermeasure information stored in the at least one database, based on the information received, and change how to output alarm information representing the state of the abnormality and the state of the countermeasure, in accordance with the state of the abnormality in the abnormality information and the state of the countermeasure in the countermeasure information;
output the selected abnormality information and the selected countermeasure information as the alarm information; and
receive abnormality registration information and, based on the stored countermeasure information, store a predetermined countermeasure and its contents along with the received abnormality registration information and execute the predetermined countermeasure by a department in response to receiving the abnormality registration information.

2. The operation control system according to claim 1,
wherein the at least one database stores therein information on which alarm information is outputted with respect to the department and an operation performed in the department or which alarm information is outputted with respect to the work category and the operation.

3. The operation control system according to claim 1,
wherein a priority order is displayed to a plurality of pieces of the alarm information having been outputted to the output part.

4. The operation control system according to claim 1,
wherein a department at which a countermeasure to an abnormality is currently taken is allowed to pass information on a state of a progress of the countermeasure, to another department.

5. The operation control system according to claim 1, further comprising:
a display,
wherein the at least one processor is configured to display the outputted alarm information on a single screen in the display.

6. The operation control system according to claim 1, further comprising a display;
wherein the at least one processor is configured to:
divide a screen of the display into two parts,
make the alarm information on the department displayed on a first part of the screen, and
make the alarm information on a department having the hierarchical relationship lower than the department displayed on a second part of the screen.

7. An operation control method performed by an operation control system, comprising the steps of:
collecting information on an abnormality in a plurality of departments of a factory, a plurality of the departments having a hierarchical relationship therebetween;
storing the collected information on the abnormality in at least one database of the operation control system, in which abnormality information including information on a state of the abnormality is stored, or in which countermeasure information including information on a state of a countermeasure for the abnormality is stored;
receiving information on one of the departments requested by a user and information on a work category of the user, the work category being a position of the user in the department;
storing selection information which is information on, in the department and the work category, which one of the abnormality information stored in the abnormality information storage part and the countermeasure information stored in the countermeasure information is to be selected;
monitoring a length of a time period during which the abnormality continues;
when the length of the time period exceeds a prescribed time period, updating the state of the abnormality of the abnormality information;
monitoring the state of the countermeasure;
when the state of the countermeasure changes, updating the state of the countermeasure of the countermeasure information;
selecting the abnormality information and the countermeasure information stored in the at least one database, based on the information received, and changing how to output alarm information representing the state of the abnormality and the state of the countermeasure, in accordance with the state of the abnormality in the abnormality information and the state of the countermeasure in the countermeasure information;

outputting the selected abnormality information and the selected countermeasure information as the alarm information; and receiving abnormality registration information and, based on the stored countermeasure information, storing a predetermined countermeasure and its contents along with the received abnormality registration information and executing the predetermined countermeasure by a department in response to receiving the abnormality registration information.

* * * * *